US011508339B2

(12) United States Patent
Jeong et al.

(10) Patent No.: US 11,508,339 B2
(45) Date of Patent: Nov. 22, 2022

(54) ELECTRONIC DEVICE FOR CHANGING DISPLAYED IMAGE ASSOCIATED WITH CAMERA POSITIONED BELOW DISPLAY AND OPERATING METHOD THEREOF

(71) Applicant: Samsung Electronics Co., Ltd., Suwon-si (KR)

(72) Inventors: Seoghee Jeong, Suwon-si (KR); Ilsik Kim, Suwon-si (KR); Sangheon Kim, Suwon-si (KR); Changhoon Kang, Suwon-si (KR); Kwangkyu Park, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/116,520

(22) Filed: Dec. 9, 2020

(65) Prior Publication Data

US 2021/0174769 A1 Jun. 10, 2021

(30) Foreign Application Priority Data

Dec. 9, 2019 (KR) ........................ 10-2019-0162866

(51) Int. Cl.
*G09G 5/373* (2006.01)
*G09G 5/02* (2006.01)
*H04N 5/225* (2006.01)

(52) U.S. Cl.
CPC .............. *G09G 5/373* (2013.01); *G09G 5/02* (2013.01); *H04N 5/2257* (2013.01); *G09G 2354/00* (2013.01)

(58) Field of Classification Search
None
See application file for complete search history.

(56) References Cited

U.S. PATENT DOCUMENTS 9,392,165 B2 7/2016 Choi
2009/0102763 A1* 4/2009 Border ................... H04N 7/144
345/87

(Continued)

FOREIGN PATENT DOCUMENTS

CN  108957855 A * 12/2018 ....... G02F 1/133605
CN  109541833 A    3/2019

(Continued)

OTHER PUBLICATIONS

International Search Report dated Mar. 30, 2021, issued in International Application No. PCT/KR2020/017935.

(Continued)

*Primary Examiner* — Patrick F Valdez
(74) *Attorney, Agent, or Firm* — Jefferson IP Law, LLP

(57) ABSTRACT

An electronic device is provided. The electronic device includes a display, a camera module configured to be positioned below the display, a memory configured to store instructions, and a processor configured to be functionally connected to the display, the camera module, and the memory, wherein the processor is configured, by executing the instructions, to cause the electronic device to identify a change in an operating state of the camera module while displaying a predetermined image in an area of the display surrounding the camera module, change a size of the area surrounding the camera module in response to identifying the change in the operating state of the camera module, and display the predetermined image in the changed area.

19 Claims, 20 Drawing Sheets

(56) References Cited

U.S. PATENT DOCUMENTS

| | | | |
|---|---|---|---|
| 2015/0294627 A1* | 10/2015 | Yoo | H04M 1/72454 |
| | | | 345/690 |
| 2017/0054911 A1 | 2/2017 | Lee et al. | |
| 2017/0084231 A1* | 3/2017 | Chew | G09G 3/20 |
| 2017/0117336 A1 | 4/2017 | Rappoport et al. | |
| 2018/0007255 A1 | 1/2018 | Tang | |
| 2019/0130822 A1 | 5/2019 | Jung et al. | |
| 2019/0244560 A1 | 8/2019 | Lee et al. | |
| 2020/0204715 A1* | 6/2020 | Ouyang | H01L 27/326 |

FOREIGN PATENT DOCUMENTS

| | | | |
|---|---|---|---|
| CN | 110456571 A | * | 11/2019 |
| JP | 2008-009224 A | | 1/2008 |
| KR | 10-2014-0060760 A | | 5/2014 |
| KR | 10-2017-0021125 A | | 2/2017 |
| KR | 10-2017-0096565 A | | 8/2017 |
| KR | 10-2018-0117003 A | | 10/2018 |
| KR | 10-2019-0015573 A | | 2/2019 |
| KR | 10-2019-0050334 A | | 5/2019 |
| KR | 10-2020-0092762 A | | 8/2020 |
| WO | WO-2021047325 A1 | * | 3/2021 |

OTHER PUBLICATIONS

Extended European Search Report dated Sep. 22, 2022, issued in European Patent Application No. 20899075.4.

* cited by examiner

ELECTRONIC DEVICE FOR CHANGING DISPLAYED IMAGE ASSOCIATED WITH CAMERA POSITIONED BELOW DISPLAY AND OPERATING METHOD THEREOF

CROSS-REFERENCE TO RELATED APPLICATION(S)

This application is based on and claims priority under 35 U.S.C. § 119(a) of a Korean patent application number 10-2019-0162866, filed on Dec. 9, 2019, in the Korean Intellectual Property Office, the disclosure of which is incorporated by reference herein in its entirety.

BACKGROUND

1. Field

The disclosure relates to an electronic device for changing a display in a designated area of a display and a method of operating the same.

2. Description of Related Art

Electronic devices have evolved so as to minimize bezels of surfaces on which displays are positioned. Changes have been made, in order to minimize bezels of electronic devices, such that various components (for example, camera modules and sensor modules) positioned according to the related art on surfaces on which displays are positioned are now disposed below the displays.

The above information is presented as background information only to assist with an understanding of the disclosure. No determination has been made, and no assertion is made, as to whether any of the above might be applicable as prior art with regard to the disclosure.

SUMMARY

If the camera module is disposed below the display, light from the display may be reflected inside the electronic device and recognized by the camera module. If light from the display is recognized by the camera module in this manner, the quality of images acquired by the camera module may be degraded.

Accordingly, there is a need for research regarding a method for preventing degradation of the quality of images acquired by the camera module even when the camera module is disposed below the display.

Technical objectives to be accomplished in this document are not limited to the above-mentioned technical objectives, and other technical objectives not mentioned herein may be clearly understood by those skilled in the art to which the disclosure pertains from the following description.

Aspects of the disclosure are to address at least the above-mentioned problems and/or disadvantages and to provide at least the advantages described below. Accordingly, an aspect of the disclosure is to provide . . . .

Additional aspects will be set forth in part in the description which follows and, in part, will be apparent from the description, or may be learned by practice of the presented embodiments.

In accordance with an aspect of the disclosure, an electronic device is provided. The electronic device includes a display, a camera module configured to be positioned below the display, a memory configured to store instructions, and a processor configured to be functionally connected to the display, the camera module, and the memory. The processor may be configured, by executing the instructions, to cause the electronic device to identify a change in an operating state of the camera module while displaying a predetermined image in an area of the display surrounding the camera module, change a size of the area surrounding the camera module in response to identifying the change in the operating state of the camera module, and display the predetermined image in the changed area.

In accordance with another aspect of the disclosure, a method of operating an electronic device is provided. The method of an electronic device includes identifying a change in an operating state of a camera module while displaying a predetermined image in an area of a display surrounding the camera module positioned below the display, changing a size of the area surrounding the camera module in response to identifying the change in the operating state of the camera module, and displaying the predetermined image in the changed area.

An electronic device and a method thereof according to various embodiments are advantageous in that, even when the camera module is disposed below the display, the quality of images acquired by the camera module may not be degraded.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
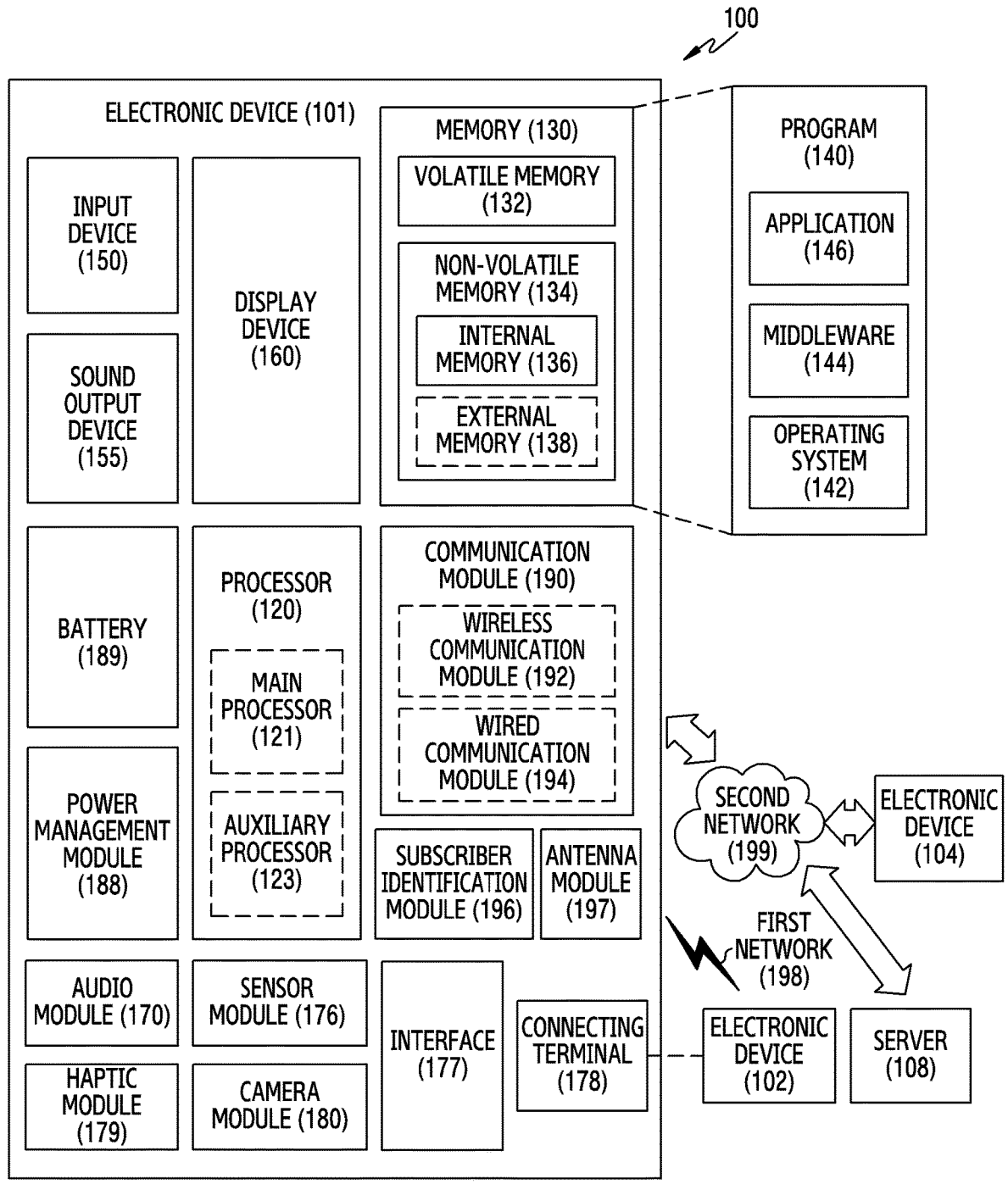
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
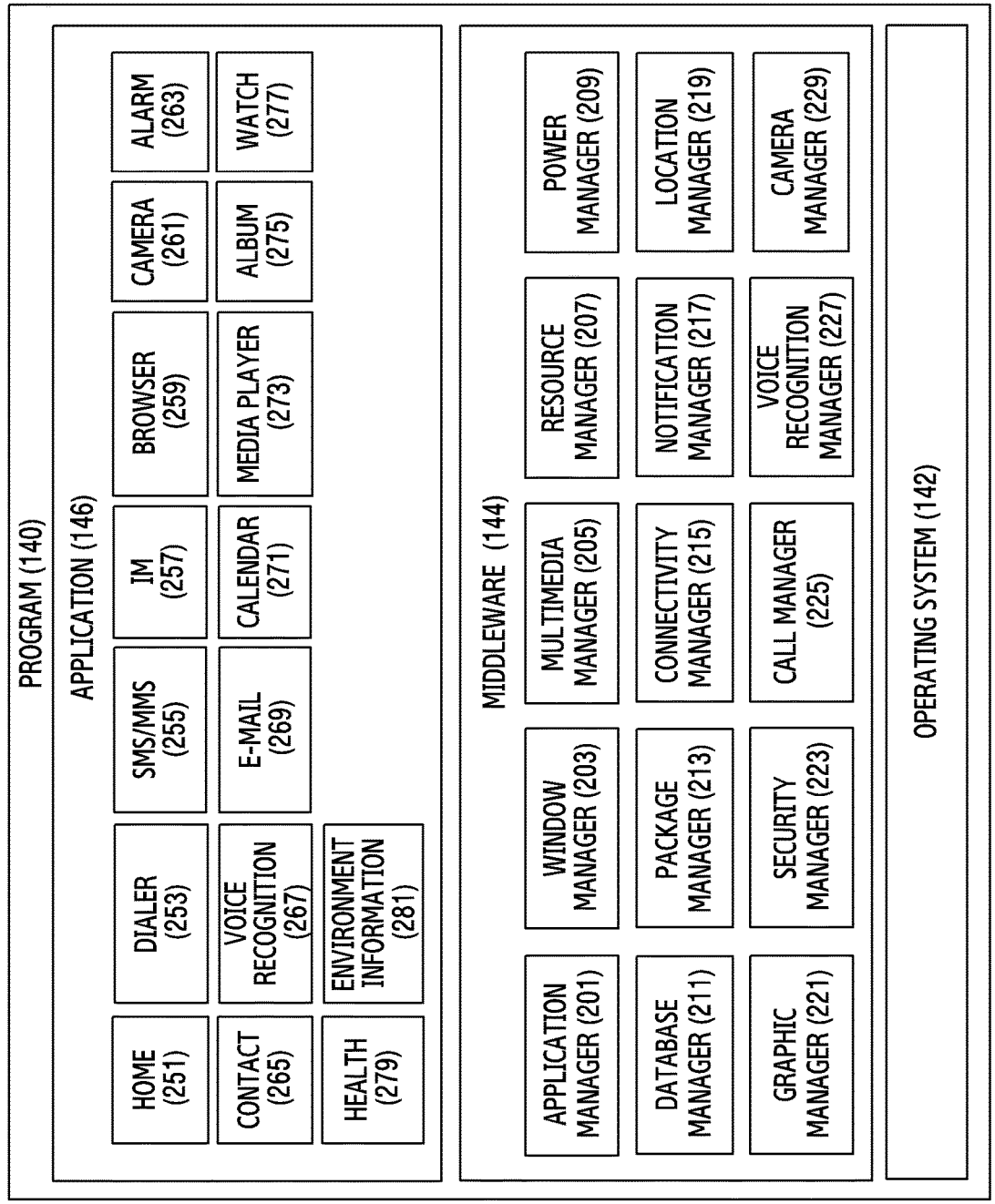
FIG. 2 is a block diagram illustrating a program according to an embodiment of the disclosure.

FIG. 2 is a block diagram 200 illustrating a program according to an embodiment of the disclosure.

Referring to FIG. 2, the program 140 may include the OS 142 to control one or more resources of the electronic device 101, middleware 144, or an application 146 executable in the OS 142. The OS 142 may include, for example, Android™, iOS™ Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., a process, a memory, or a power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment of the disclosure, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment of the disclosure, the middleware 244 may dynamically delete some existing components or add new components. According to an embodiment of the disclosure, at least part of the middleware 144 may be included as part of the OS 142 or may be implemented as another software separate from the OS 142.

The application 146 may include, for example, a home 251, a dialer 253, a short message service (SMS)/a multimedia messaging service (MMS) 255, an instant message (IM) 257, a browser 259, a camera 261, an alarm 263, a contact 265, a voice recognition 267, an email 269, a calendar 271, a media player 273, an album 275, a watch 277, health 279 (e.g., for measuring the degree of workout or biometric information, such as blood sugar), or environmental information 281 (e.g., for measuring air pressure, humidity, or temperature information) application. According to an embodiment of the disclosure, the application 146 may further include an information exchanging application (not shown) that is capable of supporting information exchange between the electronic device 101 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., a receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., an adjustment of brightness, a resolution, or a focus) of the external electronic device or some component thereof (e.g., a display device or a camera module of the external electronic device). The device management application, additionally or alternatively, may support installation, delete, or update of an application running on the external electronic device.

Figure 3:
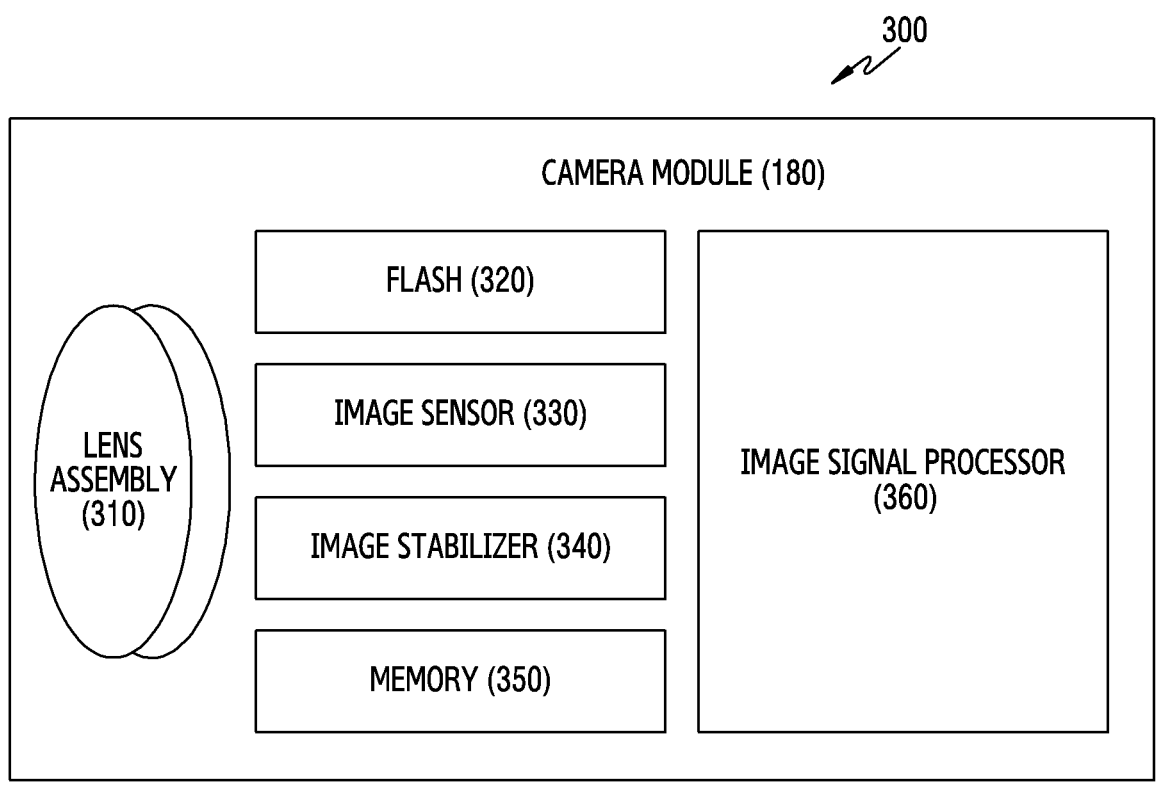
FIG. 3 is a block diagram illustrating a camera module according to an embodiment of the disclosure.

FIG. 3 is a block diagram 300 illustrating a camera module according to an embodiment of the disclosure.

Referring to FIG. 3, the camera module 180 may include a lens assembly 310, a flash 320, an image sensor 330, an image stabilizer 340, memory 350 (e.g., a buffer memory), or an image signal processor 360. The lens assembly 310 may collect light emitted or reflected from an object whose image is to be taken. The lens assembly 310 may include one or more lenses. According to an embodiment of the disclosure, the camera module 180 may include a plurality of lens assemblies 310. In such a case, the camera module 180 may form, for example, a dual camera, a 360-degree camera, or a spherical camera. Some of the plurality of lens assemblies 310 may have the same lens attribute (e.g., a view angle, a focal length, an auto-focusing, f number, or an optical zoom), or at least one lens assembly may have one or more lens attributes different from those of another lens assembly. The lens assembly 310 may include, for example, a wide-angle lens or a telephoto lens.

The flash 320 may emit light that is used to reinforce light reflected from an object. According to an embodiment of the disclosure, the flash 320 may include one or more light emitting diodes (LEDs) (e.g., a red-green-blue (RGB) LED, a white LED, an infrared (IR) LED, or an ultraviolet (UV) LED) or a xenon lamp. The image sensor 330 may obtain an image corresponding to an object by converting light emitted or reflected from the object and transmitted via the lens assembly 310 into an electrical signal. According to an embodiment of the disclosure, the image sensor 330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 330 may be implemented using, for example, a charged coupled device (CCD) sensor or a complementary metal oxide semiconductor (CMOS) sensor.

The image stabilizer 340 may move the image sensor 330 or at least one lens included in the lens assembly 310 in a particular direction, or control an operational attribute (e.g., adjust the read-out timing) of the image sensor 330 in response to the movement of the camera module 180 or the electronic device 101 including the camera module 180. This allows compensating for at least part of a negative effect (e.g., image blurring) by the movement on an image being captured. According to an embodiment of the disclosure, the image stabilizer 340 may detect such a movement by the camera module 180 or the electronic device 101 using a gyro sensor (not shown) or an acceleration sensor (not shown) disposed inside or outside the camera module 180. According to an embodiment of the disclosure, the image stabilizer 340 may be implemented, for example, as an optical image stabilizer.

The memory 350 may store, at least temporarily, at least part of an image obtained via the image sensor 330 for a subsequent image processing task. For example, if image capturing is delayed due to shutter lag or multiple images are quickly captured, a raw image obtained (e.g., a Bayer-patterned image, a high-resolution image) may be stored in the memory 350, and its corresponding copy image (e.g., a low-resolution image) may be previewed via the display device 160. Thereafter, if a specified condition is met (e.g., by a user's input or system command), at least part of the raw image stored in the memory 350 may be obtained and processed, for example, by the image signal processor 360. According to an embodiment of the disclosure, the memory 350 may be configured as at least part of the memory 130 or as a separate memory that is operated independently from the memory 130.

The image signal processor 360 may perform one or more image processing with respect to an image obtained via the image sensor 330 or an image stored in the memory 350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 360 may perform control (e.g., exposure time control or read-out timing control) with respect to at least one (e.g., the image sensor 330) of the components included in the camera module 180. An image processed by the image signal processor 360 may be stored back in the memory 350 for further processing, or may be provided to an external component (e.g., the memory 130, the display device 160, the electronic device 102, the electronic device 104, or the server 108) outside the camera module 180. According to an embodiment of the disclosure, the image signal processor 360 may be configured as at least part of the processor 120, or as a separate processor that is operated independently from the processor 120. If the image signal processor 360 is configured as a separate processor from the processor 120, at least one image processed by the image signal processor 360 may be displayed, by the processor 120, via the display device 160 as it is or after being further processed.

According to an embodiment of the disclosure, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 4A:
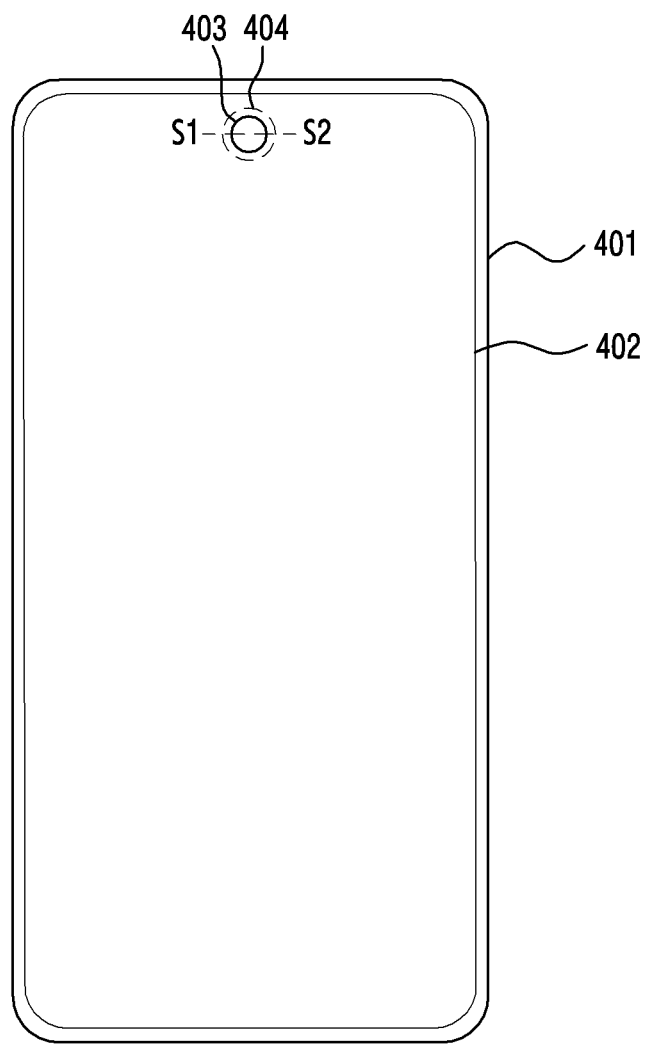
FIG. 4A is a diagram illustrating an electronic device according to an embodiment of the disclosure.

FIG. 4A is a diagram illustrating an electronic device 401 according to an embodiment of the disclosure. In an embodiment of the disclosure, a description of FIG. 4A may refer to FIGS. 1 to 3. In an embodiment of the disclosure, the electronic device 401 of FIG. 4A may correspond to the electronic device 101 of FIG. 1. In an embodiment of the disclosure, a display panel 402 of FIG. 4A may be included in the display device 160 of FIG. 1.

Referring to FIG. 4A, on the display panel 402 of the electronic device 401, a camera module (e.g., the camera module 180 of FIG. 1) may be provided in an area 403 for acquiring an image. In an embodiment of the disclosure, the area 403 for acquiring an image may be an area corresponding to the angle of view of the camera module 180. In an embodiment of the disclosure, the area 403 for acquiring an image may also be referred to as an area surrounding the camera module 180.

Referring to FIG. 4A, a cutout stroke 404 may exist around the area 403 for acquiring an image. In an embodiment of the disclosure, the cutout stroke 404 may be an area on the display panel 402 that is configured to express a predetermined color (e.g., black).

In an embodiment of the disclosure, the electronic device 401 may display a predetermined color and/or a predetermined image in an area of the display panel 402 corresponding to the cutout stroke 404, thereby expressing the predetermined color in the cutout stroke 404.

In an embodiment of the disclosure, the electronic device 401 may turn off the area of the display panel 402 corresponding to the cutout stroke 404, thereby expressing the predetermined color in the cutout stroke 404.

In an embodiment of the disclosure, the area surrounding the camera module 180 may include the area 403 for acquiring an image and/or the cutout stroke 404.

Figure 4B:
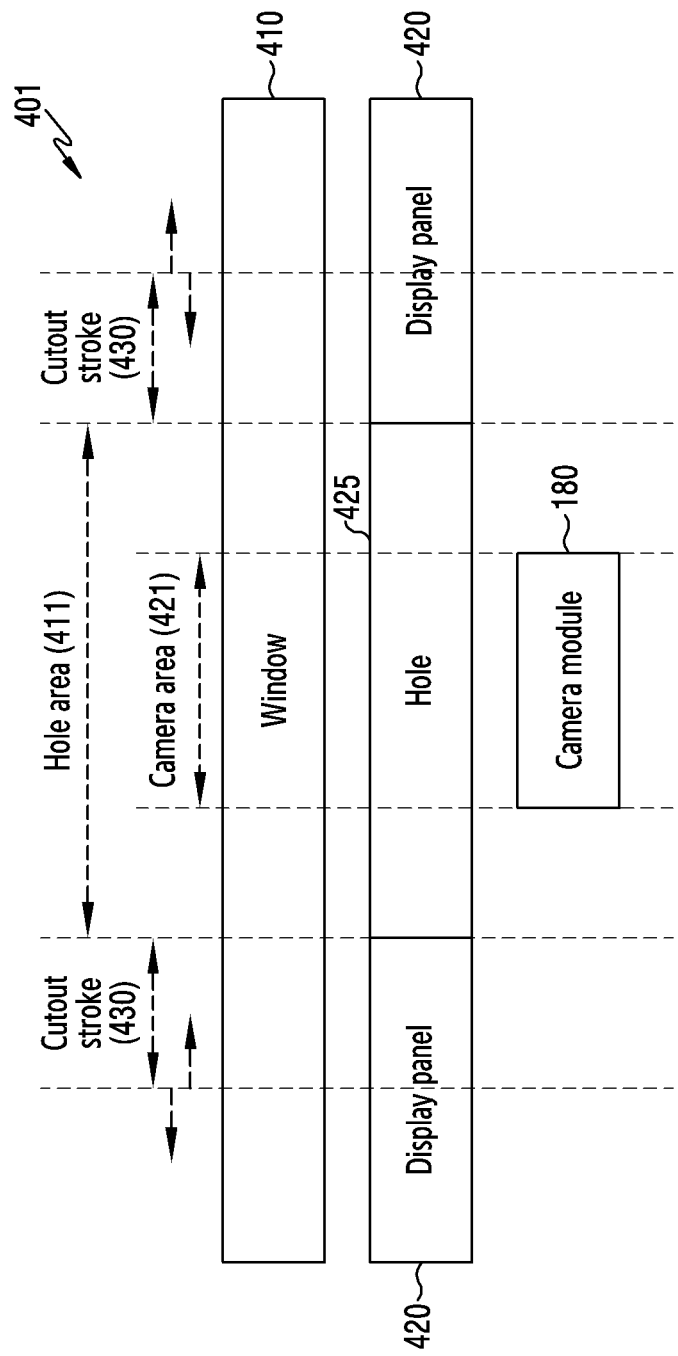
FIG. 4B is a diagram illustrating at least a part of a cross section of an electronic device according to an embodiment of the disclosure.

FIG. 4B is a diagram illustrating at least a part of a cross section of an electronic device according to an embodiment of the disclosure.

Referring to FIG. 4B, it illustrates a cross section between S1 and S2 of the electronic device 401 of FIG. 4A. In an embodiment of the disclosure, the display panel 420 of FIG. 4B may be included in the display device 160 of FIG. 1. In an embodiment of the disclosure, the camera module 180 of FIG. 4B may correspond to the camera module 180 of FIG. 1. In an embodiment of the disclosure, a description of FIG. 4B may refer to FIGS. 1 to 3.

In an embodiment of the disclosure, a window 410 may form one surface of the electronic device 101.

In an embodiment of the disclosure, the display panel 420 may be disposed below the window 410 and may include a hole 425. In an embodiment of the disclosure, the hole 425 may also be referred to as an opening. In an embodiment of the disclosure, when the electronic device 101 is viewed from above (from top to bottom in FIG. 4A), the hole 425 may be implemented in the form of surrounding the camera module 180. In an embodiment of the disclosure, the hole 425 may be implemented in the form of a circle, an ellipse, a polygon, or a combination thereof. In an embodiment of the disclosure, the display panel 420 may also be referred to as a display.

In an embodiment of the disclosure, the hole 425 may be an area from which the display panel 420 is removed. In an embodiment of the disclosure, the hole 425 may be an area in which the display panel 420 is made transparent. In an embodiment of the disclosure, the hole 425 generated by removing the display panel 420 may be referred to as a punch hole or a through-hole. In an embodiment of the disclosure, the hole 425 generated by the display panel 420 being transparent may also be referred to as a glass hole or a transparent hole.

In an embodiment of the disclosure, the camera module 180 may be disposed below the display panel 420 and can be viewed through the window 410. In an embodiment of the disclosure, the camera module 180 may acquire an image by sensing light passing through the window 410 and the hole 425 of the display panel 420. In an embodiment of the disclosure, an area of the window 410 where the camera module 180 is directly viewed may be referred to as a camera area 421. In an embodiment of the disclosure, the camera area 421 may also be referred to as an area covering the camera module 180.

In an embodiment of the disclosure, when a user looks at a hole area 411, the camera module 180 can be identified through the transparent window 410 and the hole 425. In an embodiment of the disclosure, the hole area 411 excluding the camera area 421 may be displayed in a predetermined color (e.g., black) to the user. In an embodiment of the disclosure, a black matrix may be disposed between pixels of the display panel 420 so that the hole area 411 excluding the camera area 421 can be displayed in the predetermined color (e.g., black) to the user. In an embodiment of the disclosure, the black matrix may not be disposed in the camera area 421.

In an embodiment of the disclosure, the processor 120 of the electronic device 101 may control the display panel 420 to display a predetermined color and/or a predetermined image in an area of the display panel 420 corresponding to the cutout stroke 430. In an embodiment of the disclosure, the predetermined color may be black. In an embodiment of the disclosure, the predetermined image may be an image having a black color.

In an embodiment of the disclosure, the processor 120 of the electronic device 101 may control the display panel 420 to turn off the area of the display panel 420 corresponding to the cutout stroke 430. In an embodiment of the disclosure, when the area of the display panel 420 corresponding to the cutout stroke 430 is turned off, the area of the display panel 420 corresponding to the cutout stroke 430 may be viewed as black by a black matrix.

In an embodiment of the disclosure, the processor 120 may change the size and/or shape of the cutout stroke 430 according to the operating state of the electronic device 101. In an embodiment of the disclosure, when the camera module 180 is in an image capturing state, the processor 120 may change the thickness of the cutout stroke 430 to be increased. In an embodiment of the disclosure, the processor 120 may change the thickness of the cutout stroke 430 to be reduced when the camera module 180 is in a turned off state or an illuminance measurement state.

In an embodiment of the disclosure, the hole area 411 may correspond to the area 403 for acquiring an image of FIG. 4A.

Referring to FIG. 4B, it is illustrated that the area corresponding to the cutout stroke 430 and the hole area 411 are divided, but this is only an example. In an embodiment of the disclosure, an area of the hole area 411 excluding the camera area 421 may be included in the area corresponding to the cutout stroke 430. In an embodiment of the disclosure, when the area of the hole area 411 excluding the camera area 421 is included in the area corresponding to the cutout stroke 430, the area surrounding the camera module 180 may be divided into the area corresponding to the cutout stroke 430 and the camera area 421.

Figure 4C:
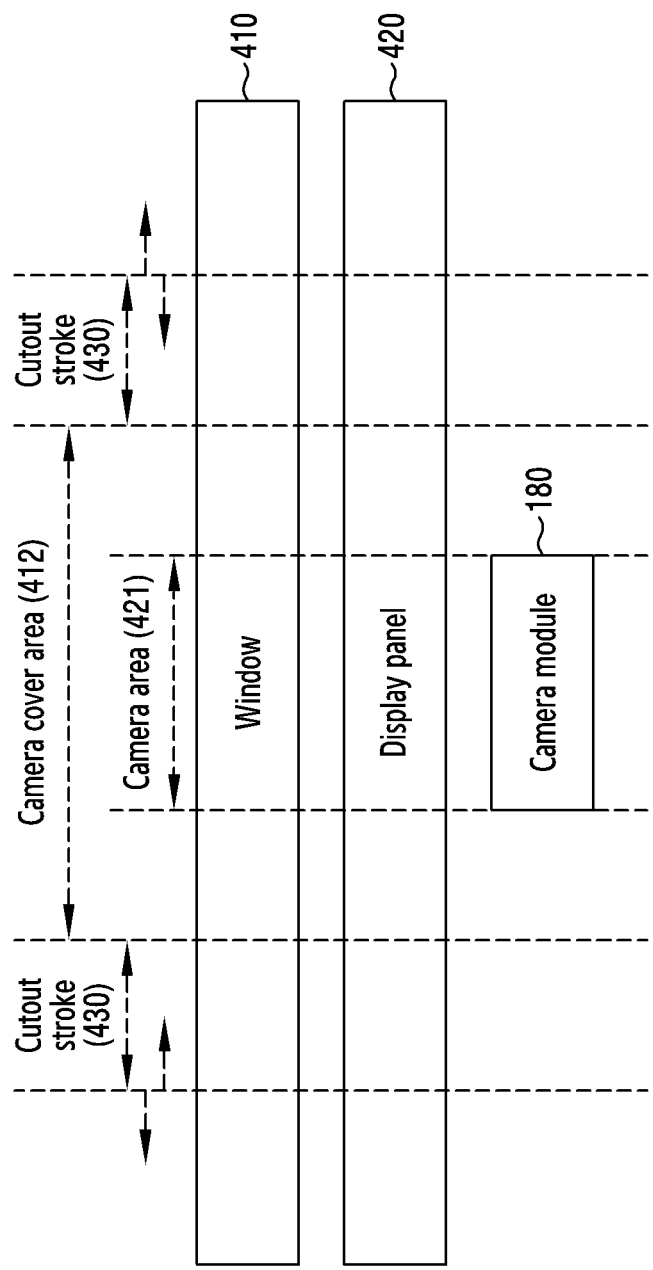
FIG. 4C is a diagram illustrating at least a part of a cross section of an electronic device according to an embodiment of the disclosure.

FIG. 4C is a diagram illustrating a cross section of an electronic device 401 according to an embodiment of the disclosure.

Referring to FIG. 4C, it may illustrate a cross section between S1 and S2 of the electronic device 401 of FIG. 4A. In an embodiment of the disclosure, the display panel 420 of FIG. 4C may be included in the display device 160 of FIG. 1. In an embodiment of the disclosure, the camera module 180 of FIG. 4C may correspond to the camera module 180 of FIG. 1. In an embodiment of the disclosure, a description of FIG. 4C may refer to FIGS. 1 to 3. Among the descriptions of FIG. 4C, descriptions overlapping those of FIG. 4B may be omitted.

In an embodiment of the disclosure, the window 410 may form one surface of the electronic device 101.

In an embodiment of the disclosure, the display panel 420 may be disposed below the window 410. In an embodiment of the disclosure, light may pass through the display panel 420. In an embodiment of the disclosure, light may pass through the display panel 420 through a space between pixels of the display panel 420. In an embodiment of the disclosure, light may pass through the display panel 420 through the space between the pixels of the display panel 420 and/or a space between the black matrices.

In an embodiment of the disclosure, the camera module 180 may be disposed below the display panel 420. In an embodiment of the disclosure, the camera module 180 may acquire an image by sensing light passing through the window 410 and the display panel 420. In an embodiment of the disclosure, an area of the window 410 in which the camera module 180 is located may be referred to as the camera area 421.

In an embodiment of the disclosure, when the display panel 420 is turned off, the camera cover area 412 may be displayed in a predetermined color (e.g., black) to the user. In an embodiment of the disclosure, a black matrix may be disposed between the display panel 420 and the camera module 180 so that the camera cover area 412 can be displayed in the predetermined color (e.g., black) to the user. In an embodiment of the disclosure, the black matrix may not be disposed in the camera area 421. In an embodiment of the disclosure, the camera cover area 412 may be an area surrounding the camera module 180.

In an embodiment of the disclosure, the processor 120 of the electronic device 101 may control the display panel 420 to display a predetermined color and/or a predetermined image in the area of the display panel 420 corresponding to the cutout stroke 430.

In an embodiment of the disclosure, the processor 120 may control the display panel 420 to turn off the area of the display panel 420 corresponding to the cutout stroke 430. In an embodiment of the disclosure, when the area of the display panel 420 corresponding to the cutout stroke 430 is turned off, the area of the display panel 420 corresponding to the cutout stroke 430 may be viewed as black by a black matrix.

In an embodiment of the disclosure, the processor 120 may control the display panel 420 to display a predetermined color and/or a predetermined image in an area of the display panel 420 corresponding to the camera cover area 412 while displaying the predetermined color and/or the predetermined image in the area of the display panel 420 corresponding to the cutout stroke 430. In an embodiment of the disclosure, the processor 120 may control the display panel 420 to turn off the area of the display panel 420 corresponding to the camera cover area 412 while displaying the predetermined color and/or the predetermined image in the area of the display panel 420 corresponding to the cutout stroke 430.

In an embodiment of the disclosure, the processor 120 may control the display panel 420 to display the predetermined color and the predetermined image in the area of the display panel 420 corresponding to the camera cover area 412 while turning off the area of the display panel 420 corresponding to the cutout stroke 430. In an embodiment of the disclosure, the processor 120 may control the display panel 420 to turn off the area of the display panel 420 corresponding to the camera cover area 412 while turning off the area of the display panel 420 corresponding to the cutout stroke 430.

In an embodiment of the disclosure, the processor 120 may change the size and/or shape of the cutout stroke 430 according to the operating state of the electronic device 101. In an embodiment of the disclosure, when the camera module 180 is in an image capturing state, the processor 120 may change the thickness of the cutout stroke 430 to be increased. In an embodiment of the disclosure, the processor 120 may change the thickness of the cutout stroke 430 to be reduced when the camera module 180 is in a turned off state or an illuminance measurement state.

In an embodiment of the disclosure, the camera cover area 412 may correspond to the area 403 for acquiring an image of FIG. 4A.

FIG. 4C illustrates that the area corresponding to the cutout stroke 430 and the area of the camera cover area 412 are divided, but this is only an example. In an embodiment of the disclosure, an area of the camera cover area 412 excluding the camera area 421 may be included in the area corresponding to the cutout stroke 430. In an embodiment of the disclosure, when the area of the camera cover area 412 excluding the camera area 421 is included in the area corresponding to the cutout stroke 430, the area surrounding the camera module 180 may be divided into the area corresponding to the cutout stroke 430 and the camera area 421.

Figure 5A:
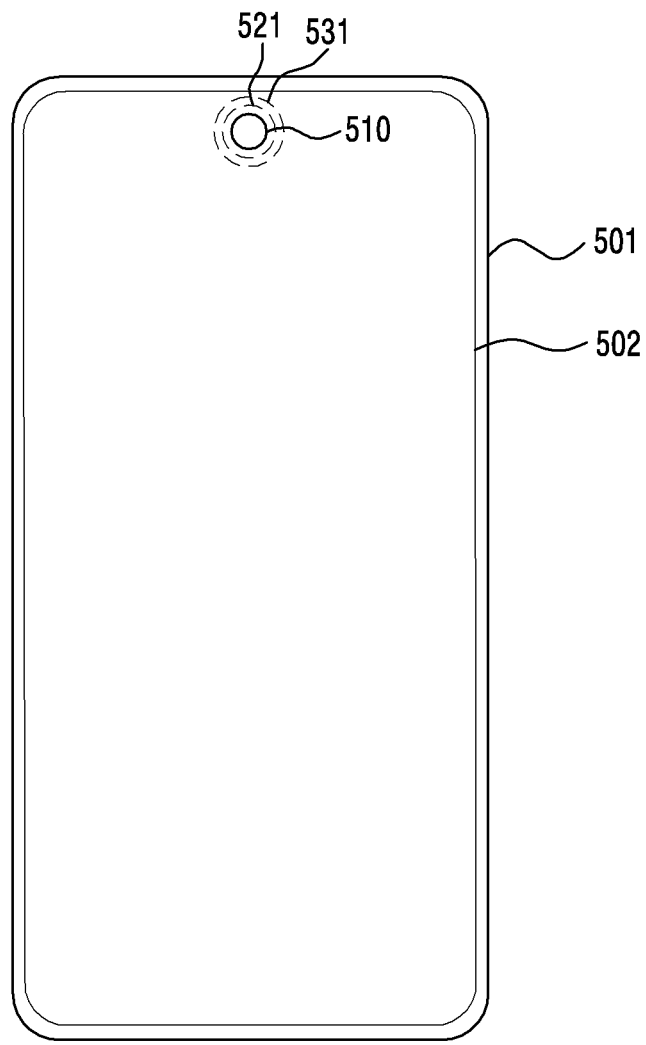
FIG. 5A is a diagram illustrating a change in a circular cutout stroke in an electronic device according to an embodiment of the disclosure.

FIG. 5A is a diagram illustrating a change in a circular cutout stroke in an electronic device 501 according to an embodiment of the disclosure.

Referring to FIG. 5A, a camera area 510 may be an area where a camera module (e.g., the camera module 180 of FIG. 1) is located. In an embodiment of the disclosure, the electronic device 501 (e.g., the electronic device 101 of FIG. 1) may a structure shown in FIG. 4A. In an embodiment of the disclosure, the electronic device 501 may have a structure shown in FIG. 4B. In an embodiment of the disclosure, the camera area 510 of FIG. 5A may correspond to the camera area 421 and/or the hole area 411 of FIG. 4A. In an embodiment of the disclosure, the camera area 510 of FIG. 5A may correspond to the camera area 421 and/or the camera cover area 412 of FIG. 4B.

Referring to FIG. 5A, cutout strokes 521 and 531 surrounding the camera area 510 may have a circular shape.

In an embodiment of the disclosure, the electronic device 501 may display a cutout stroke corresponding to the operating state of the camera module 180 on a display panel 502. In an embodiment of the disclosure, when the operating state of the camera module 180 is a turned off state or an illuminance measurement state, the electronic device 501 may display the cutout stroke 521 on the display panel 502. In an embodiment of the disclosure, when the operating state of the camera module 180 is an image capturing state, the electronic device 501 may display the cutout stroke 531 on the display panel 502.

In an embodiment of the disclosure, when the operating state of the camera module 180 is changed, the electronic device 501 may change the size and/or shape of the cutout stroke. In an embodiment of the disclosure, when the camera module 180 changes from the image capturing state to the turned off state or the illuminance measurement state, the size of the cutout stroke 531 may be changed to correspond to the cutout stroke 521. In an embodiment of the disclosure, when the camera module 180 is changed from the turned off state or the illuminance measurement state to the image capturing state, the size of the cutout stroke 521 may be changed to correspond to the cutout stroke 531.

In an embodiment of the disclosure, when the electronic device 501 has the structure shown in FIG. 4B, the electronic device 501 may display a predetermined color and/or a predetermined image in an area of the display panel 502 corresponding to each of the cutout strokes 521 and 531. In an embodiment of the disclosure, when the electronic device 501 has the structure shown in FIG. 4B, since the display panel 502 does not exist in the camera area 510, the predetermined color and/or the predetermined image may not be displayed. In an embodiment of the disclosure, when the electronic device 501 has the structure shown in FIG. 4B, the camera module 180 may always be viewed through the camera area 510.

In an embodiment of the disclosure, when the electronic device 501 has the structure shown in FIG. 4B, the electronic device 501 may turn off the area of the display panel 502 corresponding to each of the cutout strokes 521 and 531.

In an embodiment of the disclosure, when the electronic device 501 has the structure shown in FIG. 4C, the electronic device 501 may display a predetermined color and/or a predetermined image in the area of the display panel 502 corresponding to each of the cutout strokes 521 and 531. In an embodiment of the disclosure, when the electronic device 501 has the structure shown in FIG. 4C, the electronic device 501 may turn off the area of the display panel 502 corresponding to each of the cutout strokes 521 and 531.

In an embodiment of the disclosure, when the electronic device 501 has the structure shown in FIG. 4C, upon displaying the predetermined color and/or the predetermined image on the area of the display panel 502 corresponding to each of the cutout strokes 521 and 531, the electronic device 501 may also display the predetermined color and/or the predetermined image on an area of the display panel 502 corresponding to the camera area 510. In an embodiment of the disclosure, when the electronic device has the structure shown in FIG. 4C, upon displaying the predetermined color and/or the predetermined image on the area of the display panel 502 corresponding to each of the cutout strokes 521 and 531, the electronic device 501 may turn off the area of the display panel 502 corresponding to the camera area 510.

In an embodiment of the disclosure, when the electronic device has the structure shown in FIG. 4C, upon turning off the area of the display panel 502 corresponding to each of the cutout strokes 521 and 531, the electronic device 501 may also display the predetermined color and/or the predetermined image on the area of the display panel 502 corresponding to the camera area 510. In an embodiment of the disclosure, when the electronic device has the structure shown in FIG. 4C, upon turning off the area of the display panel 502 corresponding to each of the cutout strokes 521 and 531, the electronic device 501 may turn off the area of the display panel 502 corresponding to the camera area 510.

In an embodiment of the disclosure, the area turned off in the display panel 502 may represent a predetermined color indicated by a black matrix.

Figure 5B:
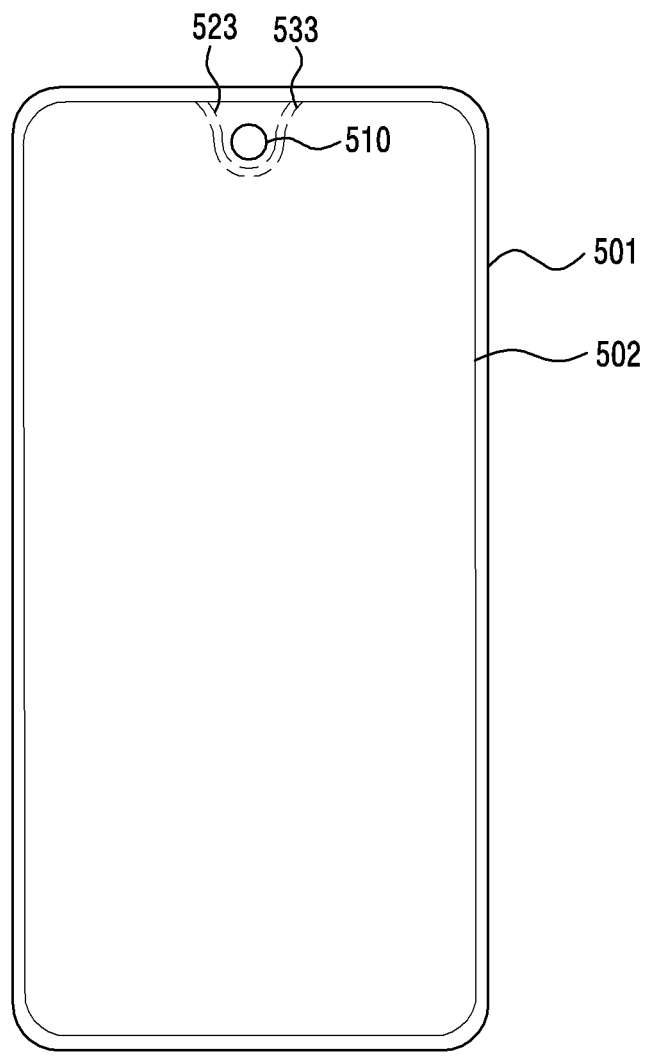
FIG. 5B is a diagram illustrating a change in a 'U'-shaped cutout stroke in an electronic device according to an embodiment of the disclosure.

FIG. 5B is a diagram illustrating a change in a 'U'-shaped cutout stroke in an electronic device 501 according to an embodiment of the disclosure. Among the descriptions of FIG. 5B, descriptions overlapping those of FIG. 5A may be omitted.

Referring to FIG. 5B, cutout strokes 523 and 533 surrounding the camera area 510 may have a 'U' shape.

In an embodiment of the disclosure, when the operating state of the camera module 180 is a turned off state or an illuminance measurement state, the electronic device 501 may display the cutout stroke 523 on the display panel 502. In an embodiment of the disclosure, when the operating state of the camera module 180 is an image capturing state, the electronic device 501 may display the cutout stroke 533 on the display panel 502.

In an embodiment of the disclosure, when the operating state of the camera module 180 is changed, the electronic device 501 may change the size and/or shape of the cutout stroke.

In an embodiment of the disclosure, when the electronic device 501 has the structure shown in FIG. 4B, the electronic device 501 may display a predetermined color and/or a predetermined image on an area of the display panel 502 corresponding to each of the cutout strokes 523 and 533. In an embodiment of the disclosure, when the electronic device 501 has the structure shown in FIG. 4B, the electronic device 501 may turn off the area of the display panel 502 corresponding to each of the cutout strokes 523 and 533.

In an embodiment of the disclosure, when the electronic device 501 has the structure shown in FIG. 4C, the electronic device 501 may display the predetermined color and/or the predetermined image on the area of the display panel 502 corresponding to each of the cutout strokes 523 and 533. In an embodiment of the disclosure, when the electronic device 501 has the structure shown in FIG. 4C, the electronic device 501 may turn off the area of the display panel 502 corresponding to each of the cutout strokes 523 and 533.

In an embodiment of the disclosure, when the electronic device 501 has the structure shown in FIG. 4C, the electronic device 501 may also display the predetermined color and/or the predetermined color on the area of the display panel 502 corresponding to the camera area 510. In an embodiment of the disclosure, when the electronic device 501 has the structure shown in FIG. 4C, the electronic device 501 may turn off the area of the display panel 502 corresponding to the camera area 510.

In an embodiment of the disclosure, the area turned off in the display panel 502 may represent a predetermined color indicated by a black matrix.

Figure 5C:
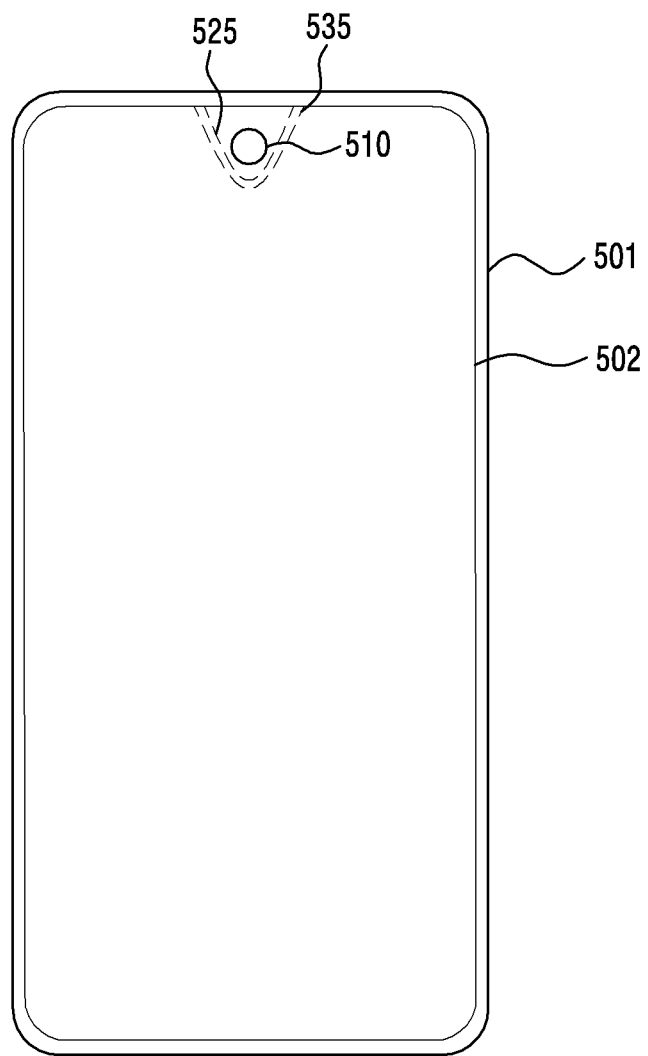
FIG. 5C is a diagram illustrating a change in a 'V'-shaped cutout stroke in an electronic device according to an embodiment of the disclosure.

FIG. 5C is a diagram illustrating a change in a 'V'-shaped cutout stroke in an electronic device 501 according to an embodiment of the disclosure. Among the descriptions of FIG. 5C, descriptions overlapping those of FIG. 5A may be omitted.

Referring to FIG. 5C, cutout strokes 525 and 535 surrounding the camera area 510 may have a 'V' shape.

In an embodiment of the disclosure, the operating state of the camera module 180 is a turned off state or an illuminance measurement state, the electronic device 501 may display the cutout stroke 525 on the display panel 502. In an embodiment of the disclosure, when the operating state of the camera module 180 is an image capturing state, the electronic device 501 may display the cutout stroke 535 on the display panel 502.

In an embodiment of the disclosure, when the operating state of the camera module 180 is changed, the electronic device 501 may change the size and/or shape of the cutout stroke.

In an embodiment of the disclosure, when the electronic device 501 has the structure shown in FIG. 4B, the electronic device 501 may display a predetermined color and a predetermined image on an area of the display panel 502 corresponding to each of the cutout strokes 525 and 535. In an embodiment of the disclosure, when the electronic device 501 has the structure shown in FIG. 4B, the electronic device 501 may turn off the area of the display panel 502 corresponding to each of the cutout strokes 525 and 535.

In an embodiment of the disclosure, when the electronic device 501 has the structure shown in FIG. 4C, the electronic device 501 may display the predetermined color and/or the predetermined image on the area of the display panel 502 corresponding to each of the cutout strokes 525 and 535. In an embodiment of the disclosure, when the electronic device 501 has the structure shown in FIG. 4C, the electronic device 501 may turn off the area of the display panel 502 corresponding to each of the cutout strokes 525 and 535.

In an embodiment of the disclosure, when the electronic device 501 has the structure shown in FIG. 4C, the electronic device 501 may also display the predetermined color and/or the predetermined image on the area of the display panel 502 corresponding to the camera area 510. In an embodiment of the disclosure, when the electronic device 501 has the structure shown in FIG. 4C, the electronic device 501 may turn off the area of the display panel 502 corresponding to the camera area 510.

In an embodiment of the disclosure, the area turned off in the display panel 502 may represent a predetermined color indicated by a black matrix.

Figure 5D:
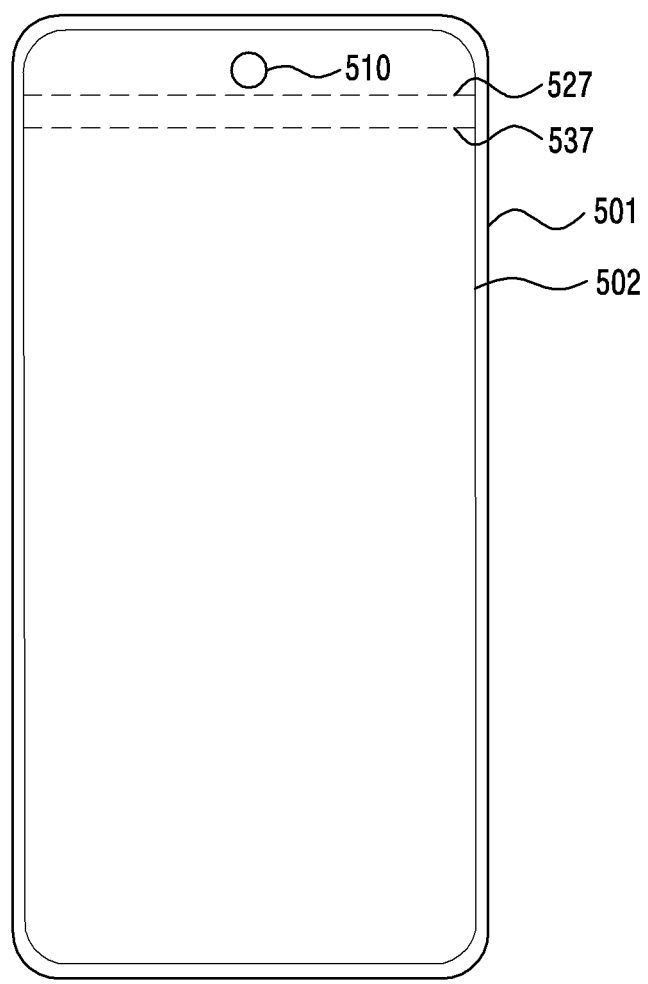
FIG. 5D is a diagram illustrating a change in a planar cutout stroke in an electronic device according to an embodiment of the disclosure.

FIG. 5D is a diagram illustrating a change in a planar cutout stroke in an electronic device 501 according to an embodiment of the disclosure. Among the descriptions of FIG. 5D, descriptions overlapping those of FIG. 5A may be omitted.

Referring to FIG. 5D, cutout strokes 527 and 537 surrounding the camera region 510 may have a planar shape. In an embodiment of the disclosure, the cutout strokes 527 and 537 may correspond to an area including the camera area 510 among two areas surrounded by a line parallel to a tangent line of the camera area 510 and the display panel 502.

In an embodiment of the disclosure, when the operating state of the camera module 180 is a turned off state or an illuminance measurement state, the electronic device 501 may display the cutout stroke 527 on the display panel 502. In an embodiment of the disclosure, when the operating state of the camera module 180 is an image capturing state, the electronic device 501 may display the cutout stroke 537 on the display panel 502.

In an embodiment of the disclosure, when the operating state of the camera module 180 is changed, the electronic device 501 may change the size and/or shape of the cutout stroke.

In an embodiment of the disclosure, when the electronic device 501 has the structure shown in FIG. 4B, the electronic device 501 may display a predetermined color and/or a predetermined image on an area of the display panel 502 corresponding to each of the cutout strokes 527 and 537. In an embodiment of the disclosure, when the electronic device 501 has the structure shown in FIG. 4B, the electronic device 501 may turn off the area of the display panel 502 corresponding to each of the cutout strokes 527 and 537.

In an embodiment of the disclosure, when the electronic device 501 has the structure shown in FIG. 4C, the electronic device 501 may display the predetermined color and/or the predetermined image on the area of the display panel 502 corresponding to each of the cutout strokes 527 and 537. In an embodiment of the disclosure, when the electronic device 501 has the structure shown in FIG. 4C, the electronic device 501 may turn off the area of the display panel 502 corresponding to each of the cutout strokes 527 and 537.

In an embodiment of the disclosure, when the electronic device 501 has the structure shown in FIG. 4C, the electronic device 501 may also display the predetermined color and/or the predetermined image on the area of the display panel 502 corresponding to the camera area 510. In an embodiment of the disclosure, when the electronic device 501 has the structure shown in FIG. 4C, the electronic device 501 may turn off the area of the display panel 502 corresponding to the camera area 510.

In an embodiment of the disclosure, the area turned off in the display panel 502 may represent a predetermined color indicated by a black matrix.

Figure 5E:
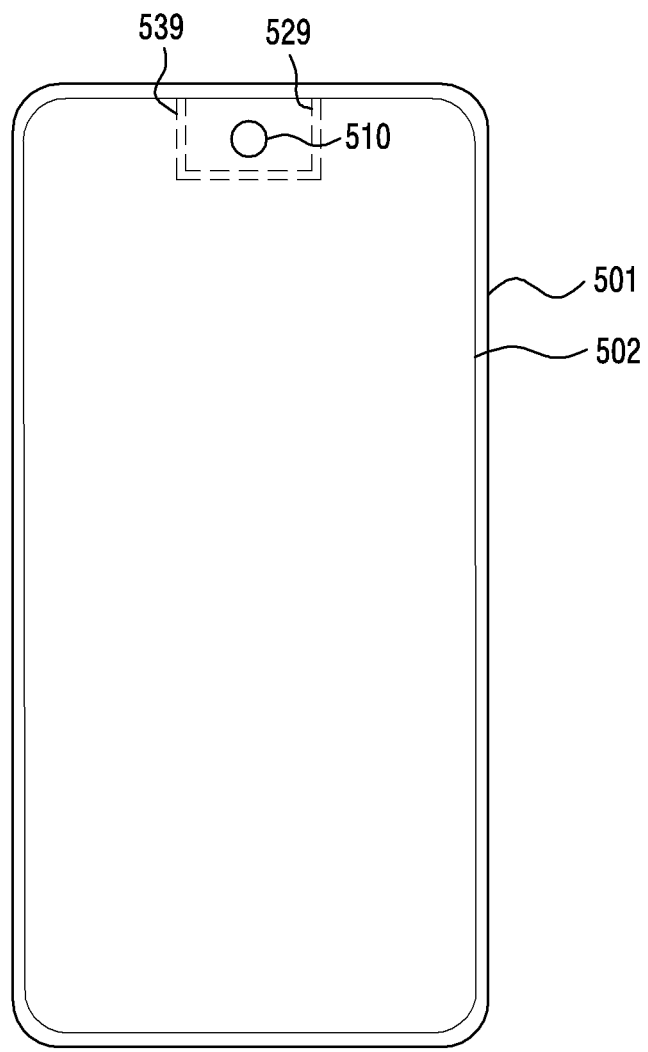
FIG. 5E is a diagram illustrating a change in a rectangular cutout stroke in an electronic device according to an embodiment of the disclosure.

FIG. 5E is a diagram illustrating a change in a rectangular cutout stroke in an electronic device 501 according to an embodiment of the disclosure. Among the descriptions of FIG. 5E, descriptions overlapping those of FIG. 5A may be omitted.

Referring to FIG. 5E, cutout strokes 529 and 539 surrounding the camera area 510 may have a rectangular shape.

In an embodiment of the disclosure, when the operating state of the camera module 180 is a turned off state or an illuminance measurement state, the electronic device 501 may display the cutout stroke 529 on the display panel 502. In an embodiment of the disclosure, when the operating state of the camera module 180 is an image capturing state, the electronic device 501 may display the cutout stroke 539 on the display panel 502.

In an embodiment of the disclosure, when the operating state of the camera module 180 is changed, the electronic device 501 may change the size and/or shape of the cutout stroke.

In an embodiment of the disclosure, when the electronic device 501 has the structure shown in FIG. 4B, the electronic device 501 may display a predetermined color and/or a predetermined image on an area of the display panel 502 corresponding to each of the cutout strokes 529 and 539. In an embodiment of the disclosure, when the electronic device 501 has the structure shown in FIG. 4B, the electronic device 501 may turn off the area of the display panel 502 corresponding to each of the cutout strokes 529 and 539.

In an embodiment of the disclosure, when the electronic device 501 has the structure shown in FIG. 4C, the electronic device 501 may display the predetermined color and/or the predetermine image on the area of the display panel 502 corresponding to each of the cutout strokes 529 and 539. In an embodiment of the disclosure, when the electronic device 501 has the structure shown in FIG. 4C, the electronic device 501 may turn off the area of the display panel 502 corresponding to each of the cutout strokes 529 and 539.

In an embodiment of the disclosure, when the electronic device 501 has the structure shown in FIG. 4C, the electronic device 501 may also display the predetermined color and/or the predetermined image on the area of the display panel 502 corresponding to the camera area 510. In an embodiment of the disclosure, when the electronic device 501 has the structure shown in FIG. 4C, the electronic device 501 may turn off the area of the display panel 502 corresponding to the camera area 510.

In an embodiment of the disclosure, the turned off area in the display panel 502 may represent a predetermined color indicated by a black matrix.

FIGS. 5A, 5B, 5C, 5D, and 5E illustrate changes in the cutout strokes between the same figures according to an embodiment of the disclosure, but the electronic device 501 according to an embodiment of the disclosure may change the cutout strokes into different figures. In an embodiment of the disclosure, the electronic device 501 may change the circular cutout stroke 521 to the rectangular cutout stroke 539 according to the operating state of the camera module 180.

FIGS. 5A, 5B, 5C, 5D, and 5E illustrate one camera area 510 in which the camera module 180 is located in the upper center of the display panel 502, but the electronic device 501 according to an embodiment of the disclosure may include the camera area 510 at another location of the display panel 502. In an embodiment of the disclosure, the electronic device 501 may include two or more camera areas 510 in which the two or more camera modules 180 are respectively positioned on the display panel 502. In an embodiment of the disclosure, the electronic device 501 may include the camera area 510 in which at least one camera module 180 is positioned at a position of upper right, upper left, lower right, lower center, lower left, or a combination thereof of the display panel 502.

Figure 6:
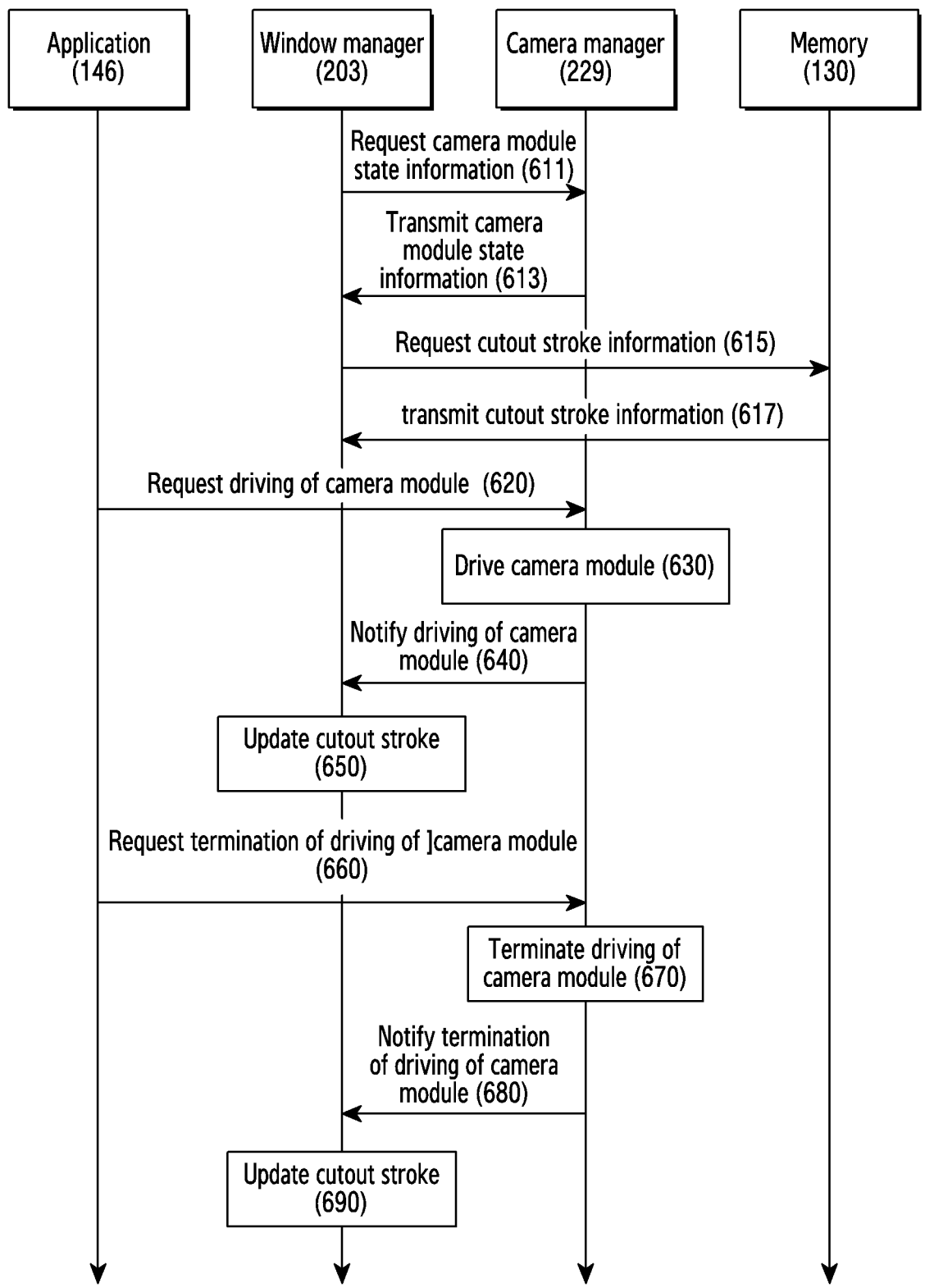
FIG. 6 is a flowchart illustrating an operation of changing a cutout stroke in an electronic device according to an embodiment of the disclosure.

FIG. 6 is a flowchart illustrating an operation of changing a cutout stroke in an electronic device 101 according to an embodiment of the disclosure. A description of FIG. 6 may refer to FIGS. 1 to 3.

Referring to FIG. 6, in operation 611, a window manager 203 may request state information of the camera module 180 from a camera manager. In an embodiment of the disclosure, the state information may be information for indicating the state of the camera module 180 (e.g., an image capturing state, a turned off state, or an illuminance measurement state).

In operation 613, a camera manager 229 may transmit the state information of the camera module 180 to the window manager 203.

In operation 615, the window manager 203 may request cutout stroke information from the memory 130. In an embodiment of the disclosure, the cutout stroke information may be information for indicating the shape and/or size of the cutout stroke.

In operation 617, the memory 130 may transmit the cutout stroke information to the window manager 203. In an embodiment of the disclosure, the memory 130 may search for the cutout stroke information stored as configuration information and may transmit the searched cutout stroke information to the window manager 203.

In an embodiment of the disclosure, operations 611 to 617 may be performed when the electronic device 101 is booted.

In operation 620, an application 146 may request driving of the camera module 180 from the camera manager 229. In an embodiment of the disclosure, the application 146 may request the driving of the camera module 180 from the camera manager 229 based on an input. In an embodiment of the disclosure, the application 146 may be an application for providing a function (e.g., an image capture or an augmented reality) related to the camera module 180 to a user by controlling the camera module 180. In an embodiment of the disclosure, the application 146 may be an application for control (e.g., a change in the brightness of the display panel) based on information (e.g., illuminance) acquired through the camera module 180 by controlling the camera module 180.

In operation 630, the camera manager 229 may drive the camera module 180 based on the driving request for the camera module 180.

In operation 640, the camera manager 229 may transmit a driving notification of the camera module 180 to the window manager 203. In an embodiment of the disclosure, the driving notification of the camera module 180 may include information on the application 146 using the camera module 180. In an embodiment of the disclosure, the driving notification of the camera module 180 may include state information of the camera module 180.

In operation 650, the window manager 203 may update the cutout stroke. In an embodiment of the disclosure, the window manager 203 may update the cutout stroke based on the driving notification of the camera module 180.

In an embodiment of the disclosure, based on driving of the camera module capable of capturing an image through the display panel (or the hole of the display panel) among the camera modules of the electronic device 101, the window manager 203 may update the cutout stroke corresponding to the driven camera module.

In an embodiment of the disclosure, based on driving of at least one camera module of the camera modules capable of capturing an image through the display panel (or the hole of the display panel), the window manager 203 may update the cutout stroke corresponding to the driven camera module.

In an embodiment of the disclosure, the window manager 203 may identify the driving state of the camera module 180 based on a driving notification of the camera module 180. In an embodiment of the disclosure, the window manager 203 may update the cutout stroke based on the identified driving state of the camera module 180. In an embodiment of the disclosure, when the camera module 180 is driven in an image capturing state, the window manager 203 may update the cutout stroke to the cutout stroke corresponding to the image capturing state. In an embodiment of the disclosure, when the camera module 180 is driven in a turned off state or an illuminance measurement state, the window manager 203 may update the cutout stroke to the cutout stroke corresponding to the turned off state or the illuminance measurement state.

In operation 660, the application 146 may request driving termination for the camera module 180 from the camera manager 229. In an embodiment of the disclosure, the application 146 may request the driving termination for the camera module 180 from the camera manager 229 based on an input. In an embodiment of the disclosure, when a user applies an input for terminating the application 146, the application 146 may request the driving termination for the camera module 180 from the camera manager 229.

In operation 670, the camera manager 229 may terminate the driving of the camera module 180 based on the driving termination request for the camera module 180.

In operation 680, the camera manager 229 may transmit a driving termination notification of the camera module 180 to the window manager 203. In an embodiment of the disclosure, the driving termination notification of the camera module 180 may include state information of the camera module 180.

In operation 690, the window manager 203 may update the cutout stroke. In an embodiment of the disclosure, the window manager 203 may update the cutout stroke based on the driving termination notification of the camera module 180.

In an embodiment of the disclosure, the window manager 203 may identify the driving state of the camera module 180 based on the driving termination notification of the camera module 180. In an embodiment of the disclosure, the cutout stroke may be updated based on the identified driving state of the camera module 180. In an embodiment of the disclosure, when the driving of the camera module 180 is terminated, the window manager 203 may update the cutout stroke to the cutout stroke corresponding to turning-off.

In an embodiment of the disclosure, based on the termination of the driving of the camera module capable of capturing an image through the display panel (or the hole of the display panel) among the camera modules of the electronic device 101, the window manager 203 may update the cutout stroke corresponding to the camera module of which driving is terminated.

In an embodiment of the disclosure, based on the termination of the driving of all of the camera modules capable of capturing an image through the display panel (or the hole of the display panel), the window manager 203 may update the cutout stroke corresponding to the camera module of which driving is terminated.

Figure 7:
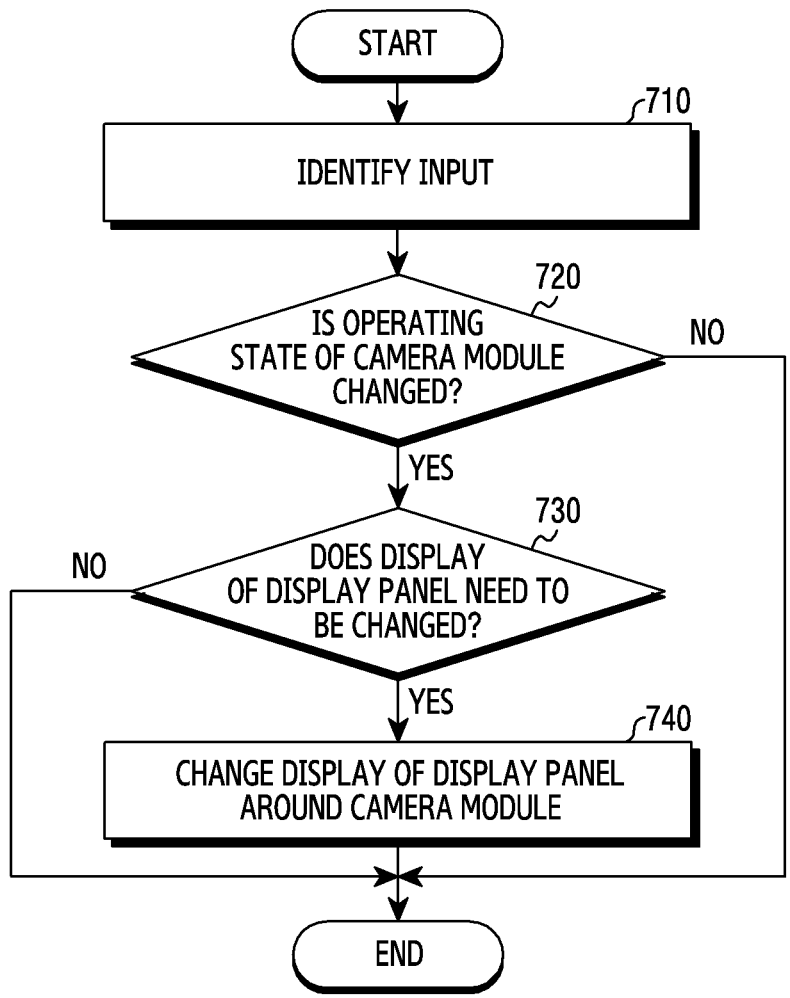
FIG. 7 is a flowchart illustrating an operation of changing a display of a display in an electronic device according to an embodiment of the disclosure.

FIG. 7 is a flowchart illustrating an operation of changing a display of a display in an electronic device 101 according to an embodiment of the disclosure. A description of FIG. 7 may refer to FIGS. 1 to 3.

Referring to FIG. 7, in operation 710, the processor 120 of the electronic device may identify an input. In an embodiment of the disclosure, the processor 120 may identify the input through the touch circuit of the input device 150 and/or the display device 160.

In an embodiment of the disclosure, the processor 120 may perform a function based on the identified input. For example, the processor 120 may execute the application 146 based on the identified input. For example, the processor 120 may execute a function (e.g., an image capturing) of the application 146 based on the identified input. For example, the processor 120 may configure a condition for executing the function of the application 146 based on the identified input (e.g., timer configuration for image capturing or flash configuration).

In operation 720, the processor 120 may identify whether the operating state of the camera module 180 has changed. In an embodiment of the disclosure, the processor 120 may identify whether the operating state of the camera module 180 has changed as a result of performing the function based on the identified input.

In an embodiment of the disclosure, when the operating state of the camera module 180 is changed ('YES'), the processor 120 may perform operation 730. For example, when the operating state of the camera module 180 is changed from the image capturing state to the turned off state or the illuminance measurement state, the processor 120 may perform operation 730.

In an embodiment of the disclosure, when the operating state of the camera module 180 is not changed ('NO'), the processor 120 may terminate the operations according to FIG. 7. For example, when the operating state of the camera module 180 is not changed in the image capturing state, the processor 120 may terminate the operations according to FIG. 7.

In operation 730, the processor 120 may identify whether the display of the display panel 420 needs to be changed. In an embodiment of the disclosure, when the cutout stroke needs to be changed, the processor 120 may identify that the display of the display panel 420 needs to be changed.

In an embodiment of the disclosure, when the operating state is changed from the image capturing state to the turned off state or the illuminance measurement state, the processor 120 may identify that the display of the display panel 420 needs to be changed. In an embodiment of the disclosure, when the operating state is changed from the turned off state or the illuminance measurement state to the image capturing state, the processor 120 may identify that the display of the display panel 420 needs to be changed.

In an embodiment of the disclosure, when the operating state is changed from the turned off state to the illuminance measurement state, the processor 120 may identify that the display of the display panel 420 does not need to be changed. In an embodiment of the disclosure, when the operating state is changed from the illuminance measurement state to the turned off state, the processor 120 may identify that the display of the display panel 420 does not need to be changed.

In an embodiment of the disclosure, when the display of the display panel 420 needs to be changed ('YES'), the processor 120 may perform operation 740. In an embodiment of the disclosure, when the display of the display panel 420 does not need to be changed ('NO'), the processor 120 may terminate the operations according to FIG. 7.

In operation 740, the processor 120 may change the display of the display panel 420 around the camera module 180.

In an embodiment of the disclosure, the processor 120 may change the display of the display panel 420 around the camera module 180 by changing the size and/or shape of the cutout stroke. In an embodiment of the disclosure, the processor 120 may change the shape of the cutout stroke to one of a circular shape, a 'U' shape, a 'V' shape, a planar shape, a rectangular shape, or a combination thereof, thereby changing the display of the display panel 420 around the camera module 180.

Figure 8:
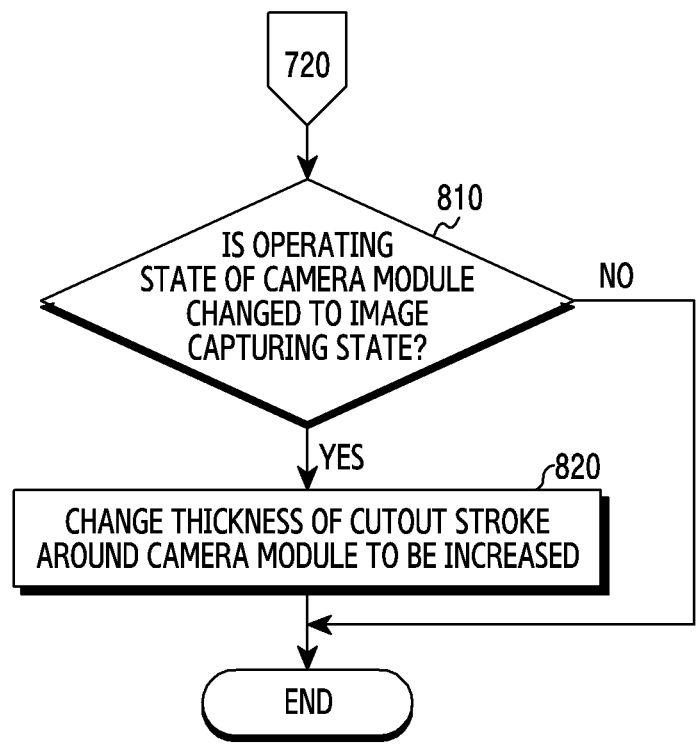
FIG. 8 is a flowchart illustrating an operation of increasing a thickness of a cutout stroke in an electronic device according to an embodiment of the disclosure.

FIG. 8 is a flowchart illustrating an operation of increasing a thickness of a cutout stroke in an electronic device 101 according to an embodiment of the disclosure. Operations of FIG. 8 may be included in operations 730 and 740 of FIG. 7.

Referring to FIG. 8, in operation 810, the processor 120 may identify whether the operating state of the camera module 180 is changed to the image capturing state. In an embodiment of the disclosure, operation 810 may be performed after operation 720 of FIG. 7.

In an embodiment of the disclosure, when the operating state of the camera module 180 is changed to the image capturing state ('YES'), the processor 120 may perform operation 820. In an embodiment of the disclosure, when the operating state of the camera module 180 is not changed to the image capturing state ('NO'), the processor 120 may terminate the operations according to FIG. 8.

In operation 820, the processor 120 may change the thickness of the cutout stroke to be increased. In an embodiment of the disclosure, the increased thickness of the cutout stroke may be about 30 pixels.

Figure 9:
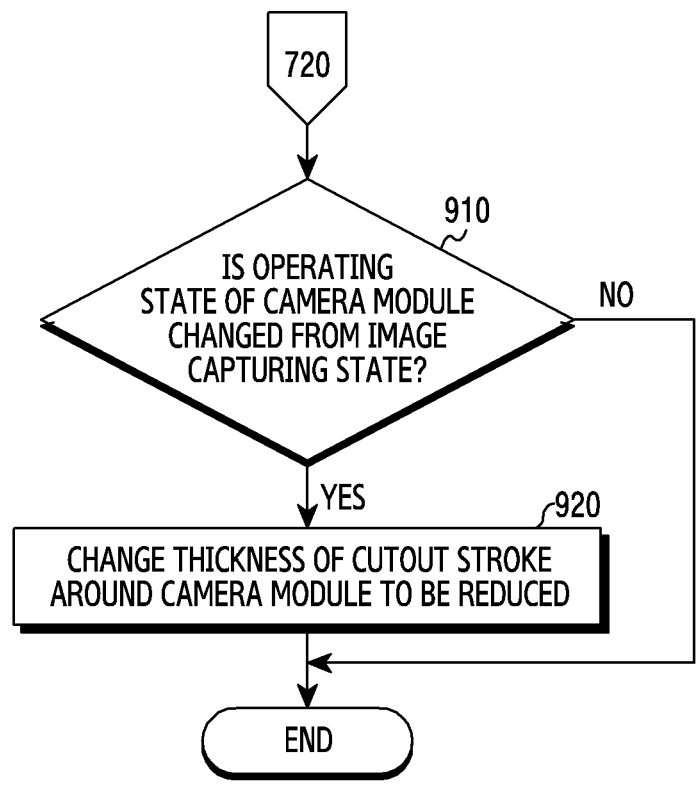
FIG. 9 is a flowchart illustrating an operation of reducing a thickness of a cutout stroke in an electronic device according to an embodiment of the disclosure.

FIG. 9 is a flowchart illustrating an operation of reducing a thickness of a cutout stroke in an electronic device according to an embodiment of the disclosure. Operations of FIG. 9 may be included in operations 730 and 740 of FIG. 7.

Referring to FIG. 9, in operation 910, the processor 120 may identify whether the operating state of the camera module 180 has changed from the image capturing state. In an embodiment of the disclosure, operation 910 may be performed after operation 720 of FIG. 7.

In an embodiment of the disclosure, when the operating state of the camera module 180 is changed from the image capturing state ('YES'), the processor 120 may perform operation 920. In an embodiment of the disclosure, when the operating state of the camera module 180 is not changed from the image capturing state ('NO'), the processor 120 may terminate the operations according to FIG. 9.

In operation 920, the processor 120 may change the thickness of the cutout stroke to be reduced. In an embodiment of the disclosure, the reduced thickness of the cutout stroke may be about 30 pixels.

Figure 10A:
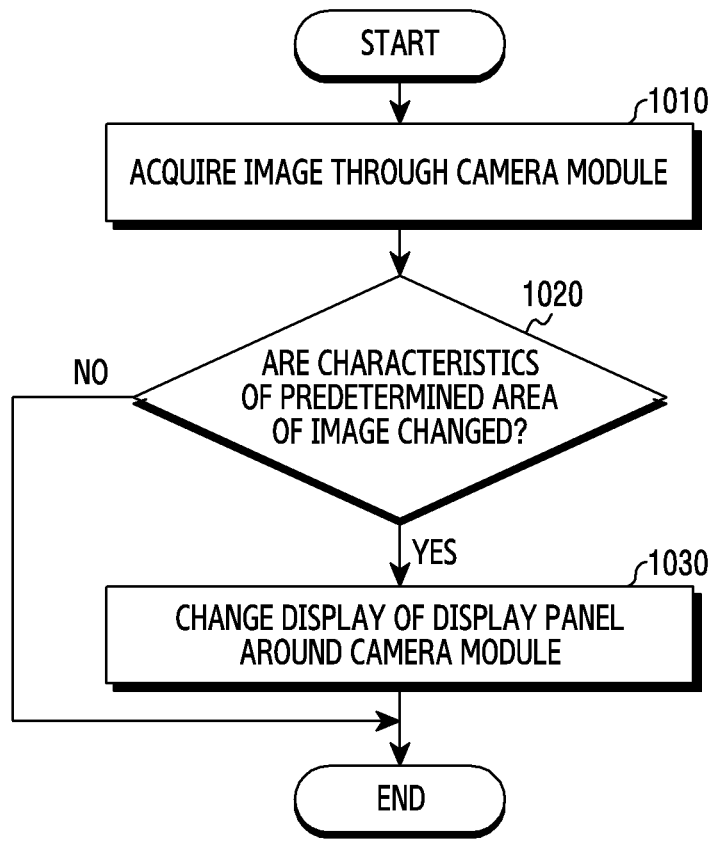
FIG. 10A is a flowchart illustrating an operation of changing a cutout stroke while acquiring an image in an electronic device according to an embodiment of the disclosure.
Figure 10B:
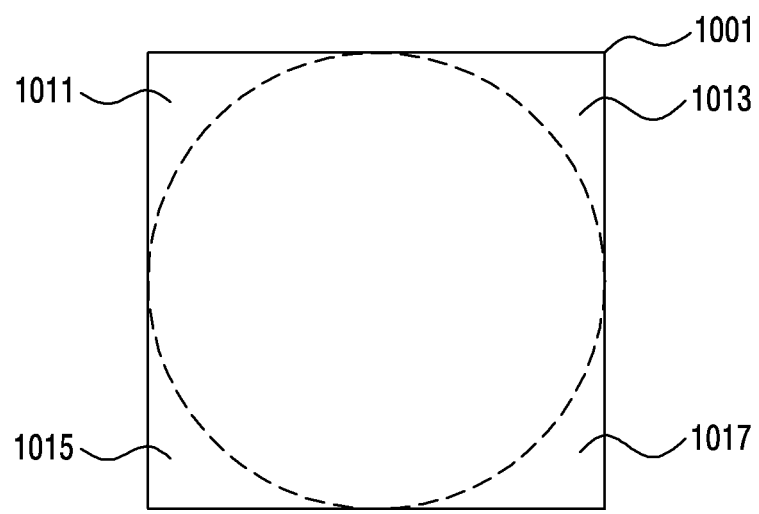
FIG. 10B is a diagram illustrating an image acquired by an electronic device according to an embodiment of the disclosure.

FIG. 10A is a flowchart illustrating an operation of changing a cutout stroke while acquiring an image in an electronic device according to an embodiment of the disclosure. FIG. 10B is a diagram illustrating an image acquired by an electronic device according to an embodiment of the disclosure. Descriptions of FIGS. 10A and 10B may refer to FIGS. 1 to 3.

Referring to FIG. 10A, in operation 1010, the processor 120 may acquire an image 1001 through the camera module 180. In an embodiment of the disclosure, the camera module 180 may be in a first state while the processor 120 acquires the image 1001. In an embodiment of the disclosure, the image 1001 may be an original image acquired through the camera module 180. In an embodiment of the disclosure, an image displayed through the display panel 420 may be a copy image of the image 1001. In an embodiment of the disclosure, the image displayed through the display panel 420 may be an image having a lower resolution than the image 1001.

Referring to FIG. 10B, it is illustrated that the image is a square, but this is only an example. In an embodiment of the disclosure, the image may have a shape corresponding to an aspect ratio of the image sensor 330 of the camera module 180.

Referring to FIG. 10A, in operation 1020, the processor 120 may identify whether the characteristics of predetermined areas 1011, 1013, 1015, and 1017 of the image 1001 have been changed. In an embodiment of the disclosure, the predetermined areas 1011, 1013, 1015, and 1017 of the image 1001 may be located at the edge of the image 1001.

In an embodiment of the disclosure, the characteristics of the predetermined areas 1011, 1013, 1015, and 1017 may include noise, resolution, brightness, or a combination thereof.

In an embodiment of the disclosure, when the occurrence of noise is changed in the predetermined areas 1011, 1013, 1015, and 1017 of the image 1001, the processor 120 may identify that the characteristics of the predetermined areas 1011, 1013, 1015, and 1017 have been changed.

In an embodiment of the disclosure, when the resolution is changed in the predetermined areas 1011, 1013, 1015, and 1017 of the image 1001, the processor 120 may identify that the characteristics of the predetermined areas 1011, 1013, 1015, and 1017 have been changed.

In an embodiment of the disclosure, when the brightness is changed in the predetermined areas 1011, 1013, 1015, and 1017 of the image 1001, the processor 120 may identify that the characteristics of the predetermined areas 1011, 1013, 1015, and 1017 have been changed.

In operation 1030, the processor 120 may change the display of the display panel 420 around the camera module 180.

In an embodiment of the disclosure, when a change occurs in a direction in which the characteristics of the predetermined areas 1011, 1013, 1015, and 1017 are degraded, the processor 120 may change the thickness of the cutout stroke around the camera module 180 to be increased. In an embodiment of the disclosure, a case in which the occurrence of noise increases, the resolution decreases, or the brightness increases may be understood as a case in which a change occurs in the direction in which the characteristics of the predetermined areas 1011, 1013, 1015, and 1017 are degraded.

In an embodiment of the disclosure, when a change occurs in a direction in which the characteristics of the predetermined areas 1011, 1013, 1015, and 1017 are improved, the processor 120 may change the thickness of the cutout stroke around the camera module 180 to be reduced. In an embodiment of the disclosure, a case in which the occurrence of noise decreases, the resolution increases, or the brightness decreases may be understood as a case in which a change occurs in the direction in which the characteristics of the predetermined areas 1011, 1013, 1015, and 1017 are improved.

In an embodiment of the disclosure, the processor 120 may change the display of the display panel 420 around the camera module 180 by changing the thickness in a partial direction of the cutout stroke.

For example, when the characteristics of the image 1001 change in the area on the left side with respect to the center of the image 1001, the processor 120 may change the thickness of the cutout stroke on the left side with respect to the center of the camera module 180.

In an embodiment of the disclosure, the processor 120 may change the display of the display panel 420 around the camera module 180 by changing the shape of the cutout stroke. In an embodiment of the disclosure, the processor 120 may change the display of the display panel 420 around the camera module 180 by changing the shape of the cutout stroke to one of a circular shape, a 'U' shape, a 'V' shape, a planar shape, a rectangular shape, or a combination thereof.

Figure 11:
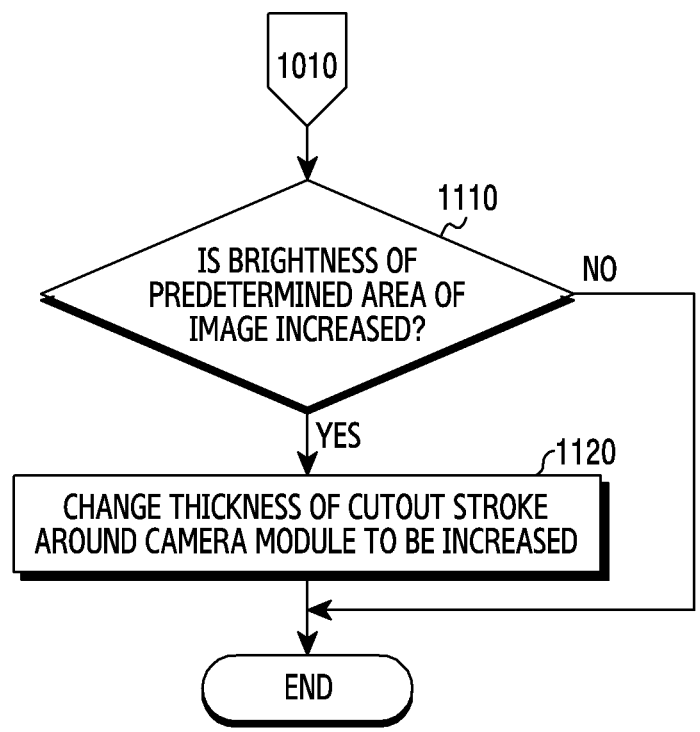
FIG. 11 is a flowchart illustrating an operation of increasing a thickness of a cutout stroke while acquiring an image in an electronic device according to an embodiment of the disclosure.

FIG. 11 is a flowchart illustrating an operation of increasing a thickness of a cutout stroke while acquiring an image in an electronic device according to an embodiment of the disclosure. Operations of FIG. 11 may be included in operations 1020 and 1030 of FIG. 10A.

Referring to FIG. 11, in operation 1110, the processor 120 may identify whether the brightness of the predetermined areas 1011, 1013, 1015, and 1017 of the image 1001 increases. In an embodiment of the disclosure, operation 1110 may be performed after operation 1010 of FIG. 10A.

In an embodiment of the disclosure, when the brightness of the predetermined areas 1011, 1013, 1015, and 1017 of the image 1001 increases ('YES'), the processor 120 may perform operation 1120. In an embodiment of the disclosure, when the brightness of the predetermined areas 1011, 1013, 1015, and 1017 of the image 1001 is not increased ('NO'), the processor 120 may terminate the operations according to FIG. 11.

In operation 1120, the processor 120 may change the thickness of the cutout stroke to be increased. In an embodiment of the disclosure, the increased thickness of the cutout stroke may be about 30 pixels.

Figure 12:
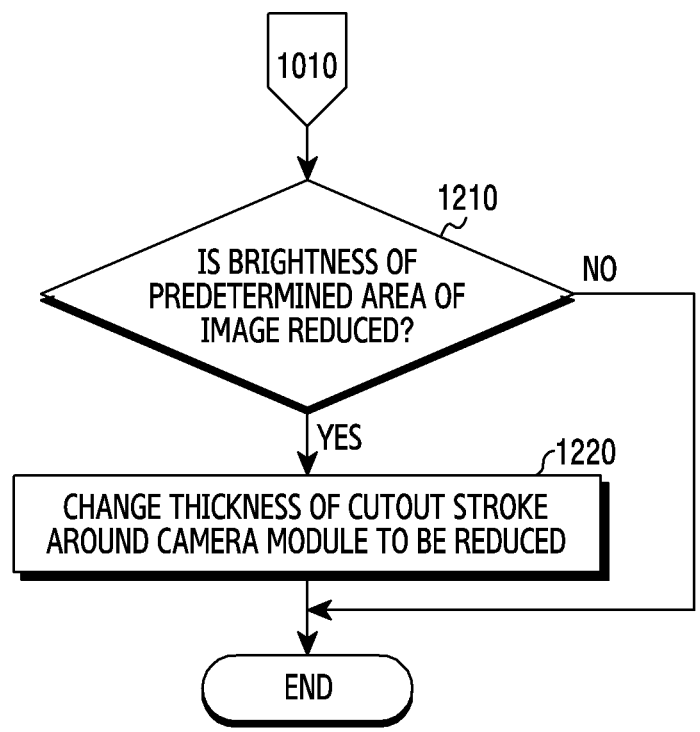
FIG. 12 is a flowchart illustrating an operation of reducing a thickness of a cutout stroke while acquiring an image in an electronic device according to an embodiment of the disclosure.

FIG. 12 is a flowchart illustrating an operation of reducing a thickness of a cutout stroke while acquiring an image in an electronic device according to an embodiment of the disclosure. Operations of FIG. 12 may be included in operations 1020 and 1030 of FIG. 10A.

Referring to FIG. 12, in operation 1210, the processor 120 may identify whether the brightness of the predetermined areas 1011, 1013, 1015, and 1017 of the image 1001 decreases. In an embodiment of the disclosure, operation 1210 may be performed after operation 1010 of FIG. 10A.

In an embodiment of the disclosure, when the brightness of the predetermined areas 1011, 1013, 1015, and 1017 of the image 1001 decreases ('YES'), the processor 120 may perform operation 1220. In an embodiment of the disclosure, when the brightness of the predetermined areas 1011, 1013, 1015, and 1017 of the image 1001 does not decrease ('NO'), the processor 120 may terminate the operations according to FIG. I.

In operation 1220, the processor 120 may change the thickness of the cutout stroke to be reduced. In an embodiment of the disclosure, the reduced thickness of the cutout stroke may be about 30 pixels.

Figure 13:
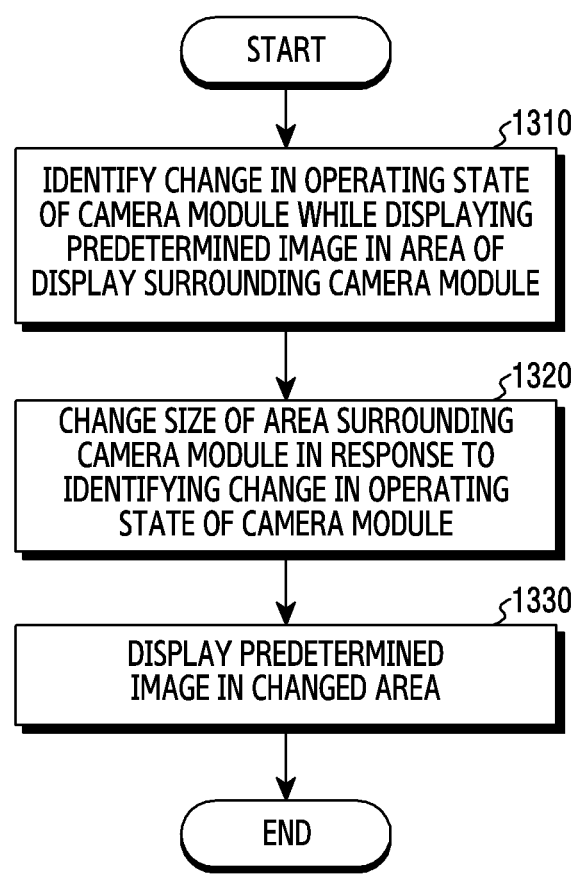
FIG. 13 is a flowchart illustrating an operation of changing an indication of a display in an electronic device according to an embodiment of the disclosure.

FIG. 13 is a flowchart illustrating an operation of changing an indication of a display in an electronic device according to an embodiment of the disclosure. A description of FIG. 13 may refer to FIGS. 1 to 3.

Referring to FIG. 13, in operation 1310, the processor 120 of the electronic device 101 may identify a change in the operating state of the camera module 180 while displaying a predetermined image in an area (e.g., an area including the cutout stroke 404 of FIG. 4A) of a display (e.g., the display device 160 of FIG. 1 or the display panel 402 of FIG. 4A) surrounding the camera module 180.

In an embodiment of the disclosure, the predetermined image may be an image for displaying a predetermined color (e.g., black).

In operation 1320, in response to identifying the change in the operating state of the camera module 180, the processor 120 may determine the size of the area surrounding the camera module 180. In an embodiment of the disclosure, the processor 120 may determine the size of the area surrounding the camera module 180 to correspond to the operating state of the camera module 180.

In operation 1330, the processor 120 may display a predetermined image in the changed area among the areas of the display (e.g., the display device 160 of FIG. 1 or the display panel 402 of FIG. 4A).

As described above, the electronic device 101 and the method thereof according to an embodiment of the disclosure may not deteriorate the quality of the image acquired by the camera module 180 even when the camera module 180 is disposed below the display panel 420.

In a case in which the camera module 180 is disposed below the display panel 420, when the display panel 420 is operated in a flash mode, the electronic device 101 and the method thereof according to an embodiment of the disclosure may not deteriorate the quality of the image acquired by the camera module 180 by increasing the thickness of the cutout stroke. In an embodiment of the disclosure, the flash mode of the display panel 420 may represent a mode in which a predetermined color (e.g., white) is displayed at a predetermined brightness in at least a portion of the display panel 420.

In a case in which the camera module 180 is disposed below the display panel 420, when the display panel 420 displays a predetermined object, the electronic device 101 and the method thereof according to an embodiment of the disclosure may not deteriorate the quality of the image acquired by the camera module 180 by increasing the thickness of the cutout stroke. In an embodiment of the disclosure, the predetermined object may be a character representing a timer.

In a case in which the camera module 180 is disposed below the display panel 420, when the display panel 420 displays a preview image, the electronic device 101 and the method thereof according to an embodiment of the disclosure may not deteriorate the quality of the image acquired by the camera module 180 by increasing the thickness of the cutout stroke based on the brightness of the preview image.

As described above, the electronic device 101 according to an embodiment of the disclosure may include a display (e.g., the display device 160 of FIG. 1); a camera module 180 configured to be positioned below the display; a memory 130 configured to store instructions; and a processor 120 configured to be functionally connected to the display, the camera module 180, and the memory 130. By executing the instructions, the processor 120 may be configured to cause the electronic device 101 to identify a change in an operating state of the camera module 180 while displaying a predetermined image in an area of the display surrounding the camera module 180. By executing the instructions, the processor 120 may be configured to cause the electronic device 101 to change the size of the area surrounding the camera module 180 in response to identifying the change in the operating state of the camera module 180. By executing the instructions, the processor 120 may be configured to cause the electronic device 101 to display the predetermined image in the changed area.

In an embodiment of the disclosure, by executing the instructions, the processor 120 may be configured to cause the electronic device 101 to change the size of the area surrounding the camera module 180 to be increased in response to identifying that the operating state of the camera module 180 is changed to an image capturing state.

In an embodiment of the disclosure, by executing the instructions, the processor 120 may be configured to cause the electronic device 101 to change the size of the area surrounding the camera module 180 to be reduced in response to identifying that the operating state of the camera module 180 is changed from the image capturing state to a state other than the image capturing state.

In an embodiment of the disclosure, the predetermined image may include an image configured in black.

In an embodiment of the disclosure, by executing the instructions, the processor 120 may be configured to cause the electronic device 101 to identify that characteristics in a predetermined area of an image acquired through the camera module 180 are changed while the operating state of the camera module 180 is the image capturing state, and to change the size of the area surrounding the camera module 180 in response to identifying that the characteristics in the predetermined area are changed.

In an embodiment of the disclosure, by executing the instructions, the processor 120 may be configured to cause the electronic device 101 to change the size of the area surrounding the camera module 180 to be increased in response to identifying that the characteristics in the predetermined area are degraded. By executing the instructions, the processor 120 may be configured to cause the electronic device 101 to change the size of the area surrounding the camera module 180 to be reduced in response to identifying that the characteristics in the predetermined area are improved.

In an embodiment of the disclosure, the characteristics may include noise, resolution, brightness, or a combination thereof. By executing the instructions, the processor 120 may be configured to cause the electronic device 101 to identify that the characteristics in the predetermined area are degraded when at least one of an increase in the noise, a reduction in the resolution, or an increase in the brightness in the predetermined area occurs. By executing the instructions, the processor 120 may be configured to cause the electronic device 101 to identify that the characteristics in the predetermined area are improved when at least one of a reduction in the noise, an increase in the resolution, or a reduction in the brightness in the predetermined area occurs.

In an embodiment of the disclosure, the display may be configured to have a hole (e.g., the hole 425 in FIG. 4B). The camera module 180 may be configured to be viewed from the outside through the hole. The area of the display surrounding the camera module 180 may be configured to surround the hole.

In an embodiment of the disclosure, the area of the display surrounding the camera module 180 may be divided into a first area (e.g., the camera area 421 of FIG. 4C) overlapping the camera module 180 and a second area (e.g., the camera cover area 412 of FIG. 4C) surrounding the first area. By executing the instructions, the processor 120 may be configured to cause the electronic device 101 to change the size of the second area in response to identifying a change in the operating state of the camera module 180.

In an embodiment of the disclosure, by executing the instructions, the processor 120 may be configured to cause the electronic device 101 to turn off the first area in response to identifying that the operating state of the camera module 180 is the image capturing state.

In an embodiment of the disclosure, by executing the instructions, the processor 120 may be configured to cause the electronic device 101 to display the predetermined image in the first area in response to identifying that the operating state of the camera module 180 is a state other than the image capturing state.

In an embodiment of the disclosure, the area surrounding the camera module 180 may be configured to have one of a circular shape, an elliptical shape, a polygonal shape, a planar shape, a 'U' shape, a 'V' shape, or a combination thereof.

As described above, a method of the electronic device 101 according to an embodiment of the disclosure may include identifying a change in an operating state of a camera module 180 while displaying a predetermined image in an area of a display (e.g., the display device 160 of FIG. 1) surrounding the camera module 180 positioned below the display; changing the size of the area surrounding the camera module 180 in response to identifying the change in the operating state of the camera module 180; and displaying the predetermined image in the changed area.

In an embodiment of the disclosure, the changing the size of the area surrounding the camera module 180 may include changing the size of the area surrounding the camera module 180 to be increased in response to identifying that the operating state of the camera module 180 is changed to an image capturing state.

In an embodiment of the disclosure, the changing the size of the area surrounding the camera module 180 may include changing the size of the area surrounding the camera module 180 to be reduced in response to identifying that the operating state of the camera module 180 is changed from the image capturing state to a state other than the image capturing state.

In an embodiment of the disclosure, the method may further include: identifying that characteristics in a predetermined area of an image acquired through the camera module 180 are changed while the operating state of the camera module 180 is the image capturing state; and changing the size of the area surrounding the camera module 180 in response to identifying that the characteristics in the predetermined area are changed.

In an embodiment of the disclosure, the changing the size of the area surrounding the camera module 180 in response to identifying that the characteristics in the predetermined area are changed may include: changing the size of the area surrounding the camera module 180 to be increased in response to identifying that the characteristics in the predetermined area are degraded; and changing the size of the area surrounding the camera module 180 to be reduced in response to identifying that the characteristics in the predetermined area are improved.

In an embodiment of the disclosure, the characteristics may include noise, resolution, brightness, and a combination thereof.

In an embodiment of the disclosure, the changing the size of the area surrounding the camera module 180 in response to identifying that the characteristics in the predetermined area are changed may include: identifying that the characteristics in the predetermined area are degraded when at least one of an increase in the noise, a reduction in the resolution, or an increase in the brightness in the predetermined area occurs; and identifying that the characteristics in the predetermined area are improved when at least one of a reduction in the noise, an increase in the resolution, or a reduction in the brightness in the predetermined area occurs.

In an embodiment of the disclosure, the area of the display surrounding the camera module 180 may be divided into a first area overlapping the camera module 180 and a second area surrounding the first area. The changing the size of the area surrounding the camera module 180 may include changing the size of the second area in response to identifying the change in the operating state of the camera module 180.

In an embodiment of the disclosure, the method may further include displaying the predetermined image in the first area in response to identifying that the operating state of the camera module 180 is a state other than the image capturing state.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a camera configured to capture images from outside through a hole of the display;
   a memory storing instructions; and
   a processor functionally connected to the display, the camera, and the memory,
   wherein the instructions, when executed by the processor, cause the electronic device to:

identify a change in an operating state of the camera while a cutout stroke image having a first size is displayed in an area of the display surrounding the hole, and in response to identifying the change in the operating state of the camera while the cutout stroke image having the first size is displayed in the area of the display surrounding the hole, display the cutout stroke image having a second size different from the first size, to surround the hole.

2. The electronic device of claim 1, wherein the instructions, when executed by the processor, further cause the electronic device to:

in response to identifying that the operating state of the camera is changed to an image capturing state, set the second size to be larger than the first size.

3. The electronic device of claim 1, wherein the instructions, when executed by the processor, further cause the electronic device to:

in response to identifying that the operating state of the camera is changed from an image capturing state to a state other than the image capturing state, set the second size to be smaller than the first size.

4. The electronic device of claim 1, wherein the cutout stroke image having the first size and the cutout stroke image having the second size each comprise an image configured in black.

5. The electronic device of claim 1, wherein the instructions, when executed by the processor, further cause the electronic device to:

identify that characteristics in a predetermined area of an image acquired through the camera are changed while the operating state of the camera is an image capturing state; and in response to identifying that the characteristics in the predetermined area are changed, change a size of the cutout stroke image being displayed in the area of the display surrounding the hole.

6. The electronic device of claim 5, wherein the instructions, when executed by the processor, further cause the electronic device to:

in response to identifying that the characteristics in the predetermined area are degraded, increase the size of the cutout stroke image, and in response to identifying that the characteristics in the predetermined area are improved, decrease the size of the cutout stroke image.

7. The electronic device of claim 6, wherein the characteristics comprise at least one of noise, resolution, brightness, or a combination thereof, and wherein the instructions, when executed by the processor, further cause the electronic device to:

in response to an occurrence of at least one of a level of the noise increasing, a level of the resolution decreasing, or a level of the brightness increasing in the predetermined area, identify that the characteristics in the predetermined area are degraded, and in response to an occurrence of at least one of the level of the noise decreasing, the level of the resolution increasing, or the level of the brightness decreasing in the predetermined area, identify that the characteristics in the predetermined area are improved.

8. The electronic device of claim 1, wherein an area of the display surrounding the camera is divided into a first area overlapping the camera and a second area surrounding the first area, and wherein the instructions, when executed by the processor, further cause the electronic device to:

in response to identifying the change in the operating state of the camera, change a size of the second area displaying the cutout stroke image having the second size.

9. The electronic device of claim 8, wherein the instructions, when executed by the processor, further cause the electronic device to:

in response to identifying that the operating state of the camera is an image capturing state, turn off the first area.

10. The electronic device of claim 8, wherein the instructions, when executed by the processor, further cause the electronic device to:

in response to identifying that the operating state of the camera is a state other than an image capturing state, display the cutout stroke image having the second size in the first area.

11. The electronic device of claim 1, wherein the cutout stroke image having the first size is configured to have at least one of a circular shape, an elliptical shape, a polygonal shape, a planar shape, a 'U' shape, a 'V' shape, or a combination thereof.

12. A method of operating an electronic device, the method comprising:

identifying a change in an operating state of a camera of the electronic device while a cutout stroke image having a first size is displayed in an area of a display of the electronic device, the area of the display surrounding a hole, wherein the camera is configured to capture images from outside through the hole of the display; and in response to identifying the change in the operating state of the camera while the cutout stroke image having the first size is displayed in the area of the display surrounding the hole, displaying the cutout stroke image having a second size different from the first size, to surround the hole.

13. The method of claim 12, wherein the displaying of the cutout stroke image having the second size comprises:

in response to identifying that the operating state of the camera is changed to an image capturing state, setting the second size to be larger than the first size.

14. The method of claim 12, wherein the displaying of the cutout stroke image having the second size comprises:

in response to identifying that the operating state of the camera is changed from an image capturing state to a state other than the image capturing state, setting the second size to be smaller than the first size.

15. The method of claim 12, further comprising:

identifying that characteristics in a predetermined area of an image acquired through the camera are changed while the operating state of the camera is an image capturing state; and in response to identifying that the characteristics in the predetermined area are changed, changing a size of the cutout stroke image being displayed in the area of the display surrounding the hole.

16. The method of claim 15, further comprising:

in response to identifying that the characteristics in the predetermined area are degraded, increasing the size of the cutout stroke image; and in response to identifying that the characteristics in the predetermined area are improved, decreasing the size of the cutout stroke image.

17. The method of claim 16,
wherein the characteristics comprise at least one of a noise, a resolution, a brightness, or a combination thereof, and
wherein the method further comprises:
  in response to an occurrence of at least one of a level of the noise increasing, a level of the resolution decreasing, or a level of the brightness increasing in the predetermined area, identifying that the characteristics in the predetermined area are degraded; and
  in response to an occurrence of at least one of the level of the noise decreasing, the level of the resolution increasing, or the level of the brightness decreasing in the predetermined area, identifying that the characteristics in the predetermined area are improved.

18. The method of claim 12,
wherein an area of the display surrounding the camera is divided into a first area overlapping the camera and a second area surrounding the first area, and
wherein the displaying of the cutout stroke image having the second size comprises, in response to identifying the change in the operating state of the camera, changing a size of the second area displaying the cutout stroke image having the second size.

19. The method of claim 18, further comprising:
in response to identifying that the operating state of the camera is a state other than an image capturing state, displaying the cutout stroke image having the second size in the first area.

* * * * *